US011159289B2

(12) United States Patent
Rico Alvarino et al.

(10) Patent No.: US 11,159,289 B2
(45) Date of Patent: *Oct. 26, 2021

(54) SOUNDING REFERENCE SIGNALS WITH COLLISIONS IN ASYMMETRIC CARRIER AGGREGATION

(71) Applicant: QUALCOMM Incorporated, San Diego, CA (US)

(72) Inventors: Alberto Rico Alvarino, San Diego, CA (US); Wanshi Chen, San Diego, CA (US); Peter Gaal, San Diego, CA (US); Jing Sun, San Diego, CA (US); Hao Xu, Beijing (CN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,249

(22) Filed: Jun. 21, 2019

(65) Prior Publication Data

US 2019/0312704 A1 Oct. 10, 2019

Related U.S. Application Data

(63) Continuation of application No. 15/479,113, filed on Apr. 4, 2017, now Pat. No. 10,333,670.
(Continued)

(51) Int. Cl.
*H04L 5/00* (2006.01)
*H04L 5/14* (2006.01)
(Continued)

(52) U.S. Cl.
CPC ............ *H04L 5/0048* (2013.01); *H04L 5/001* (2013.01); *H04L 5/0044* (2013.01);
(Continued)

(58) Field of Classification Search
CPC ... H04L 5/0044; H04L 5/0048; H04L 5/0053; H04L 5/14; H04W 56/00; H04W 72/0446
See application file for complete search history.

(56) References Cited

U.S. PATENT DOCUMENTS 10,601,555 B2 * 3/2020 Kim ........................ H04L 5/001
2011/0249639 A1 10/2011 Jen
(Continued)

FOREIGN PATENT DOCUMENTS

| CN | 101594683 A | 12/2009 |
| CN | 101771463 A | 7/2010 |

(Continued)

OTHER PUBLICATIONS

Huawei et al., "Discussion on SRS Carrier based Switching", 3GPP TSG-RAN WG4 Meeting #78bis, R4-162440, Apr. 1, 2016, XP051084311, Retrieved from the Internet: URL:http://www.3gpp.org/ftp/tsg_ran/WG4_Radio/TSGR4_78Bis/Docs/, 3 pages.
(Continued)

*Primary Examiner* — Robert C Scheibel
(74) *Attorney, Agent, or Firm* — Arent Fox LLP

(57) ABSTRACT

An apparatus may use inactive uplink portions of a downlink CC to transmit SRS to an eNB. At times there may be a collision between the SRS transmission and uplink transmissions or downlink transmissions on another CC. The apparatus receives a carrier aggregation configuration for a first downlink CC and a second CC, determines to transmit an uplink transmission on the second CC or to receive a downlink transmission on the second CC, determines that the SRS would at least partially collide with the uplink transmission or the downlink transmission, and determines to adjust at least one of the uplink transmission, the SRS transmission, or reception of the downlink transmission based on the determination of the collision and an interrup-
(Continued)

tion time to transmit the SRS in the uplink portion of the first CC.

32 Claims, 20 Drawing Sheets

Related U.S. Application Data

(60) Provisional application No. 62/333,035, filed on May 6, 2016.

(51) Int. Cl.
   *H04W 72/04* (2009.01)
   *H04W 56/00* (2009.01)

(52) U.S. Cl.
   CPC .............. *H04L 5/0053* (2013.01); *H04L 5/14* (2013.01); *H04W 56/00* (2013.01); *H04W 72/0446* (2013.01)

(56) References Cited

U.S. PATENT DOCUMENTS

| | | | |
|---|---|---|---|
| 2013/0010659 A1* | 1/2013 | Chen | H04L 5/001 370/280 |
| 2013/0128855 A1 | 5/2013 | Noh et al. | |
| 2013/0195084 A1 | 8/2013 | Chen et al. | |
| 2013/0208710 A1* | 8/2013 | Seo | H04L 5/0048 370/336 |
| 2015/0071206 A1* | 3/2015 | Seo | H04W 74/0833 370/329 |
| 2015/0195063 A1* | 7/2015 | Ro | H04L 5/005 370/329 |
| 2015/0223235 A1 | 8/2015 | Hwang et al. | |
| 2016/0157191 A1 | 6/2016 | Yokomakura et al. | |
| 2016/0295575 A1 | 10/2016 | Dinan et al. | |
| 2017/0251497 A1 | 8/2017 | Larsson et al. | |
| 2017/0279567 A1 | 9/2017 | Rahman et al. | |
| 2017/0280454 A1* | 9/2017 | Kusashima | H04L 5/0055 |
| 2017/0302419 A1* | 10/2017 | Liu | H04L 5/0091 |
| 2017/0324528 A1 | 11/2017 | Rico Alvarino et al. | |

FOREIGN PATENT DOCUMENTS

| | | |
|---|---|---|
| CN | 102638325 A | 8/2012 |
| WO | 2014109686 A1 | 7/2014 |
| WO | WO-2015005334 A1 | 1/2015 |
| WO | WO-2016048227 A2 | 3/2016 |
| WO | WO-2016053164 A1 | 4/2016 |

OTHER PUBLICATIONS

Huawei et al., "General Operation of SRS Carrier Based Switching", 3GPP TSG RAN WG1 Meeting #84bis, R1-162585, Apr. 2, 2016, XP051080273, Retrieved from the Internet: URL:http://www.3gpp.org/ftp/tsg_ran/WG1_RL1/TSGR1_84b/Docs/, 5 pages.

International Search Report and Written Opinion—PCT/US2017/026166—ISA/EPO—dated Aug. 31, 2017.

Partial International Search Report—PCT/US2017/026166—ISA/EPO—dated Jul. 10, 2017.

CATT, et al., "Measurement Gap Issues for Dual Connectivity", 3GPP TSG-RAN WG2#86, R2-142342, Seoul, South Korea, May 19, 2014-May 23, 2014, 8 Pages, May 9, 2014, Internet URL: http://www.3gpp.org/ftp/tsg_ran/WG2_RL2/TSGR2_86/Docs/R2-142342.zip.

Ericsson: "Specification Impacts to Support SRS Carrier based Switching", 3GPP TSG-RAN WG1#84b, R1-162771, Busan, Korea, Apr. 11, 2016-Apr. 15, 2016, 6 Pages, Apr. 1, 2016, Internet URL: http://www.3gpp.org/ftp/tsg_ran/WG1_RL1/TSGR1_84b/Docs/R1-162771.zip.

* cited by examiner

Determine to adjust UL, DL, or SRS

Use Prioritization Rule — 1234

Determine Puncturing/Prioritization Rule — 1236

Apply instructions in determining to adjust — 1238

SOUNDING REFERENCE SIGNALS WITH COLLISIONS IN ASYMMETRIC CARRIER AGGREGATION

CROSS-REFERENCE TO RELATED APPLICATION

This application is a Continuation of U.S. patent application Ser. No. 15/479,113, entitled "Sounding Reference Signals with Collisions in Asymmetric Carrier Aggregation" and filed on Apr. 4, 2017, now U.S. Pat. No. 10,333,670 which claims the benefit of U.S. Provisional Application Ser. No. 62/333,035, entitled "Sounding Reference Signals with Collisions in Asymmetric Carrier Aggregation" and filed on May 6, 2016, which is expressly incorporated by reference herein in its entirety.

BACKGROUND

Field

The present disclosure relates generally to communication systems, and more particularly, to sounding reference signals (SRS) in asymmetric carrier aggregation (CA).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

A wireless communication network may include a number of base stations that can support communication for a number of user equipments (UEs). A UE may communicate with a base station via the downlink (DL) and uplink (UL). The DL (or forward link) refers to the communication link from the base station to the UE, and the UL (or reverse link) refers to the communication link from the UE to the base station. This communication link may be established via a single-in-single-out (SIMO), multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, terminals can transmit SRS to base stations, which can be utilized, for example, to determine the uplink channel quality. Base stations can utilize the SRSs in allocating uplink resources to the transmitting terminal.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Some UEs may be configured with asymmetric CA in which there are more downlink component carriers than uplink component carriers. The downlink CCs may be time division duplex (TDD) and may include uplink portions. The UE may only be configured for downlink transmissions on one or more of the downlink CCs, without having an uplink portion of the CC configured for the UE to use for data transmission. However, SRS transmissions for the one or more downlink CCs could still be useful, and it may be important for the UE to be able to transmit SRS for such CCs.

Thus, the UE may be separately configured to use an inactive uplink portion of a downlink-only CC to transmit SRS to the base station. At times there may be a collision between such an SRS transmission and uplink transmissions or the reception of downlink transmissions on another configured CC. Aspects presented herein enable the UE to address the challenges associated with such collisions.

In an aspect of the disclosure, a method, a computer-readable medium, and an apparatus are provided. The apparatus receives a CA configuration for a first CC and a second CC, the first CC being a TDD CC, the CA configuration including downlink portions and excluding uplink portions of the first CC for data transmission by the UE to transmit uplink data, e.g., PUSCH. The apparatus determines to transmit an uplink transmission on the second CC in a subframe or to receive a downlink transmission in the subframe on the second CC and determines that a transmission of a SRS in an uplink portion of the first CC would at least partially collide in the subframe with either the uplink transmission or the downlink transmission. The apparatus then determines to adjust at least one of the uplink transmission, the SRS transmission, or reception of the downlink transmission based on the determination of the collision and based on an interruption time to transmit the SRS in the uplink portion of the first CC. Based on the determination to adjust, the apparatus performs at least one of transmitting the uplink transmission on the second CC, receiving the downlink transmission on the second CC, or transmitting the SRS in the uplink portion of the first CC.

In another aspect of the disclosure, a method, a computer-readable medium, and an apparatus are provided. The apparatus transmits a CA configuration comprising a first CC and a second CC to a UE the first CC being a TDD CC, the configuration including downlink portions and excluding uplink portions of the first CC for data transmission by the UE. The apparatus receives an indication of a capability from the UE and performs at least one of: receiving an uplink transmission from the UE on a second CC, sending a downlink transmission to the UE on the second CC, or receiving the SRS in the uplink portion of the first CC when the receiving or transmitting on the second CC collide with the SRS in a subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a flowchart of a method of wireless communication.

DETAILED DESCRIPTION

Figure 1:
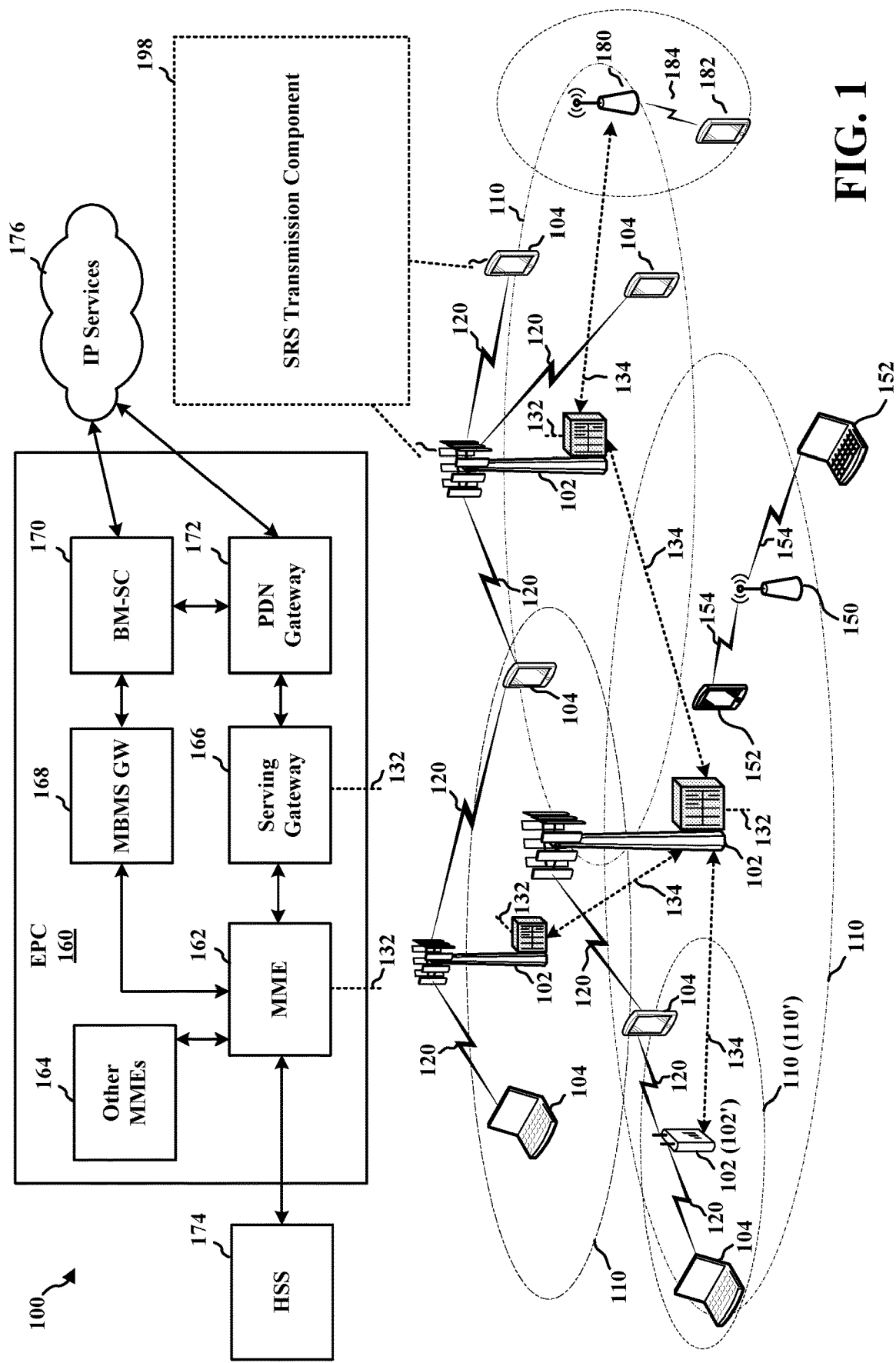
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or less carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured with an SRS transmission component (198). SRS transmission component 198 may operate to control SRS transmission in unconfigured uplink portions or subframes of a TDD component carrier as described herein. In some aspects, SRS transmission component 198 may control switching between such SRS transmissions and uplink transmissions on other CCs. Also, as described hereinafter, SRS transmission component 198 may implement algorithms for managing collisions between such SRS transmissions and UL or DL operation on other CCs and for making adjustments based on, for example, a prioritization of channels, types of control information, carriers, etc.

Figure 2:
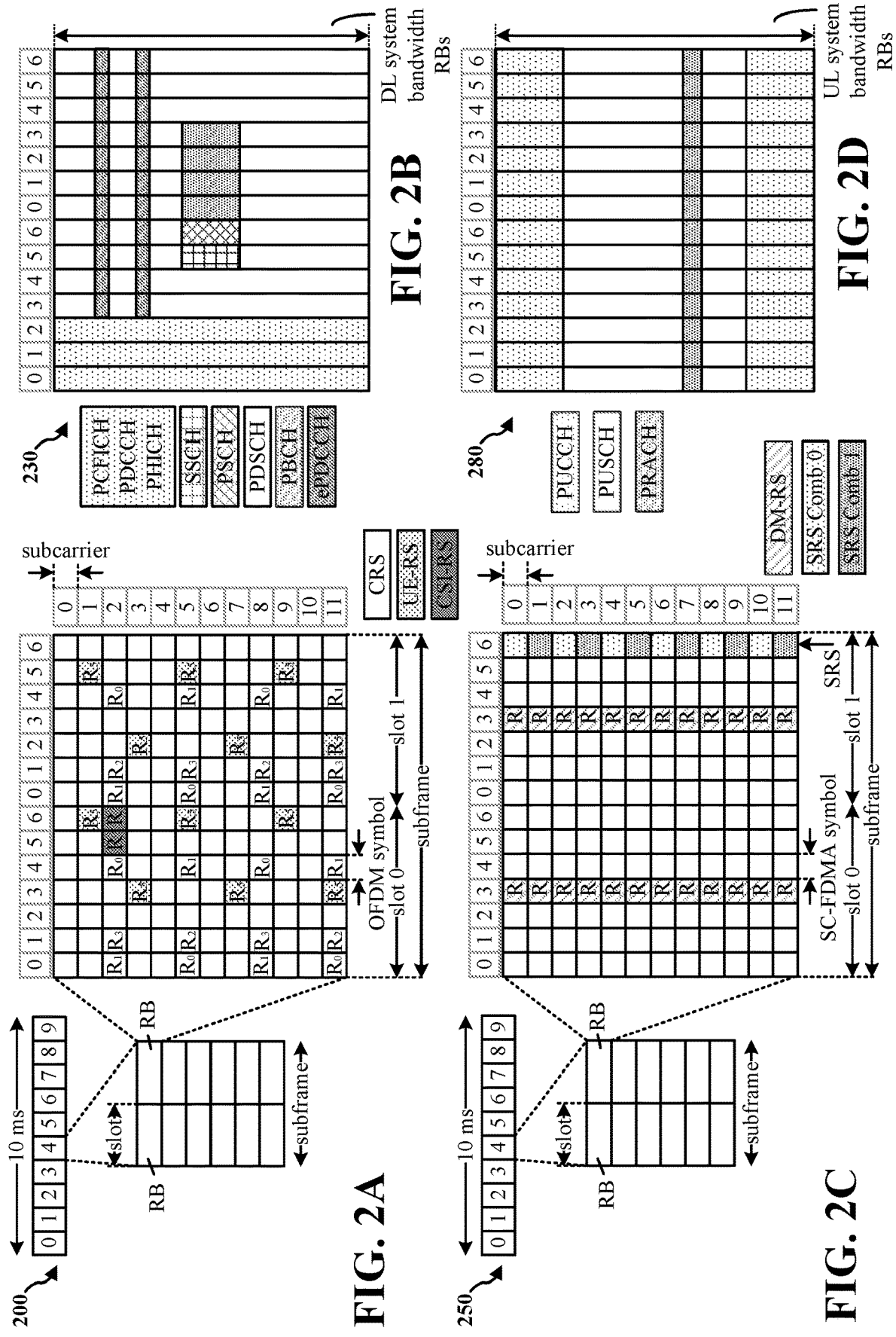
FIGS. 2A, 2B, 2C, and 2D are diagrams illustrating LTE examples of a DL frame structure, DL channels within the downlink frame structure, an UL frame structure, and UL channels within the UL frame structure, respectively.

FIG. 2A is a diagram 200 illustrating an example of a downlink frame structure in LTE. FIG. 2B is a diagram 230 illustrating an example of channels within the downlink frame structure in LTE. FIG. 2C is a diagram 250 illustrating an example of an UL frame structure in LTE. FIG. 2D is a diagram 280 illustrating an example of channels within the uplink frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry downlink reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a downlink subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the downlink system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS), e.g., in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an uplink subframe of a frame. A physical random access channel (PRACH) may be within one or more subframes within a frame based on the PRACH configuration. The PRACH may include six consecutive RB pairs within a subframe. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
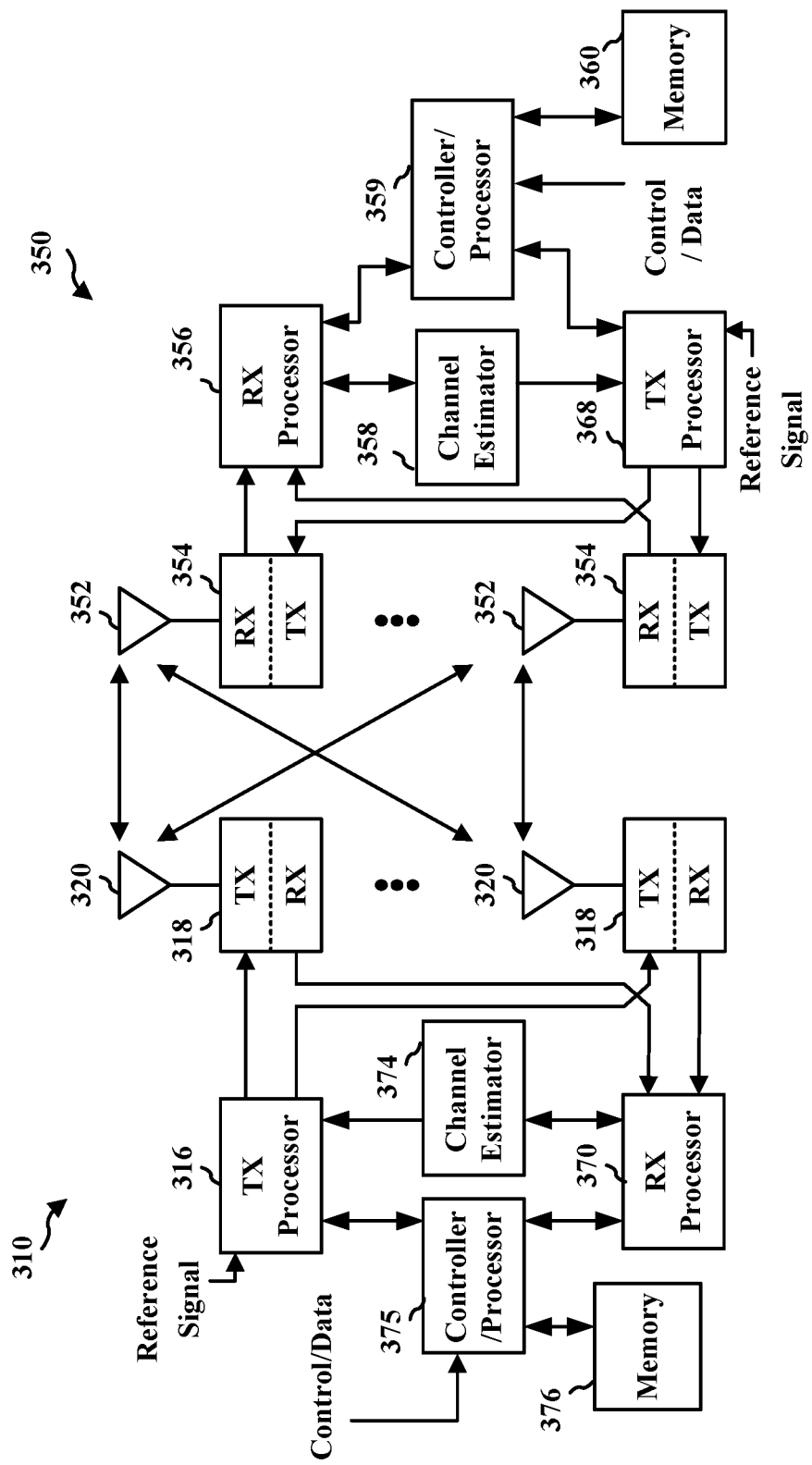
FIG. 3 is a diagram illustrating an example of an evolved Node B (eNB) and UE in an access network.

FIG. 3 is a block diagram of an eNB 310 in communication with a UE 350 in an access network. In the downlink, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations and may implement portions of SRS transmission component 198 and related features described hereinafter.

Similar to the functionality described in connection with the downlink transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Carrier Aggregation

A wireless communication system may support operation on multiple cells or carriers, a feature which may be referred to as carrier aggregation (CA) or multi-carrier operation. Each aggregated carrier may be referred to as a component carrier (CC), a layer, a channel, etc. The wireless communication system may support operation over a non-contention, licensed radio frequency spectrum band and/or a contention-based shared radio frequency spectrum band.

One carrier may be designated, or configured, as a Primary Component Carrier (PCC). One additional CC may be configured as a primary secondary CC (pScell). The Pcell and the pScell may carry PUCCH signals, and the Pcell may carry common search space signals. Thus, a UE will monitor common search space only on the Pcell. The other aggregated CCs are secondary CCs.

A UE may be configured with multiple CCs for CA, e.g., up to 32 CCs. Each CC may be up to 20 MHz and may be backward compatible. For example, for a UE that can be configured with up to 32 CCs, the UE may be configured for up to 640 MHz. In CA, the CCs may be frequency division duplex (FDD), TDD, or a combination of FDD and TDD. Different TDD CCs may have different the same DL/UL configuration or may have different DL/UL configurations. Special subframes may also be configured differently for different TDD CCs.

Different UEs may support different band combinations in CA and may have different CA capabilities with respect to their uplink and downlink operation. The configuration of the PCC may be UE specific, e.g., according to the loading on the various CCs as well as other relevant parameters. As well, certain CCs may be configured for one UE as a downlink only CC, yet may be configured for a different UE for downlink and uplink communication.

Generally, less traffic is transmitted on the uplink than the downlink, so the uplink spectrum allocation may be smaller than the downlink allocation. For example, if 20 Mhz is assigned to the uplink, the downlink may be assigned, e.g., 100 Mhz. These asymmetric FDD assignments may conserve spectrum and may be a good fit for the typically asymmetric bandwidth utilization by broadband subscribers. Therefore, a UE may be configured with multiple downlink CCs and one or more uplink CCs for carrier aggregation so that it is configured with more downlink CCs than uplink CCs.

Carrier aggregation also provides for use of SRS transmissions. UEs may transmit SRS to base stations, which can be utilized, for example, to determine the uplink channel quality. Base stations can utilize the SRSs in allocating uplink resources to the transmitting terminal. SRS may be used for a variety of actions, such as uplink link adaptation, downlink scheduling under channel reciprocity (especially for TDD systems, coordinated multipoint (COMP) operation, and the like). Certain parameters for transmitting SRSs, such as a maximum transmission bandwidth, available subframes, etc., related to a specific cell, can be defined during operation of a wireless network. Furthermore, UE specific parameters, such as a configuration index of the SRS period and subframe offset for a particular UE, bandwidth for the UE, transmission comb, SRS transmission duration, cyclic shift for generating the reference sequence, and/or the like, can also be defined at runtime. The UE may transmit SRSs as specified by these parameters.

In general, carrier aggregation supports parallel SRS transmission in which two or more component carriers may transmit SRS simultaneously. However, a UE does not typically transmit SRS in the same subframe/symbol as PUCCH or PUSCH. When PUCCH/PUSCH is scheduled in the same subframe/symbol as an SRS transmission, it is referred to as a collision, and the UE may need to make a determination regarding the SRS transmission, the uplink transmission, and/or the downlink transmission.

Carrier Aggregation Types

Figure 4A:
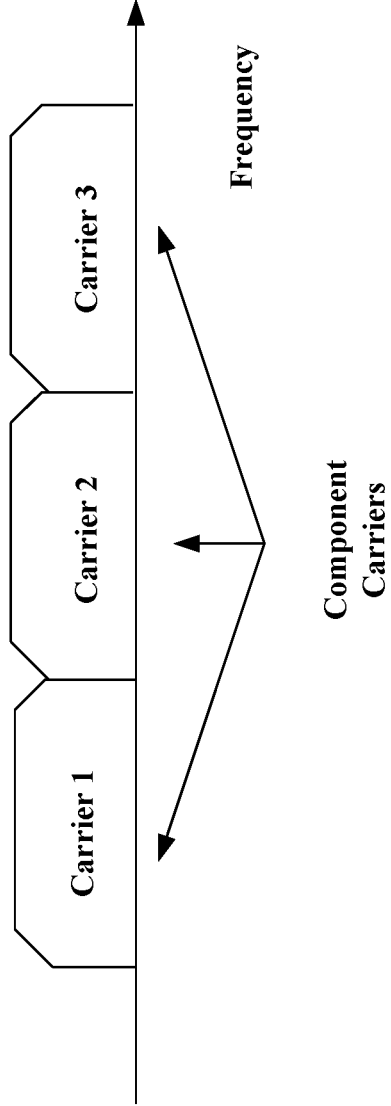
FIGS. 4A and 4B are example diagrams of carrier aggregation.
Figure 4B:
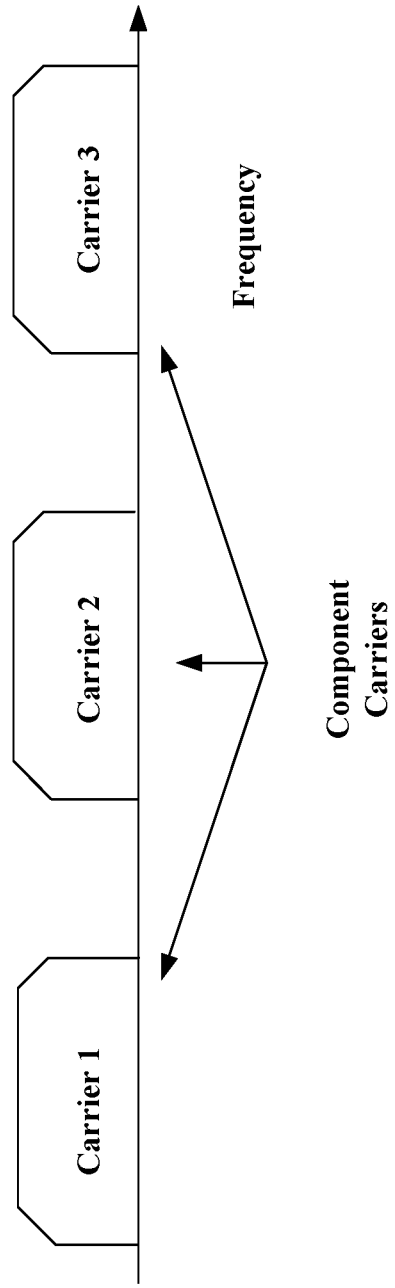

For the LTE-Advanced mobile systems, two types of CA methods have been proposed, continuous CA and non-continuous CA. They are illustrated in FIGS. 4A and 4B. Non-continuous CA occurs when multiple available component carriers are separated along the frequency band, as in FIG. 4B. On the other hand, continuous CA occurs when multiple available component carriers are adjacent to each other, as in FIG. 4A. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary considerably at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has a fixed transmitting power on each component carrier, the effective coverage or supportable modulation and coding of each component carrier may be different.

Data Aggregation Schemes

Figure 5:
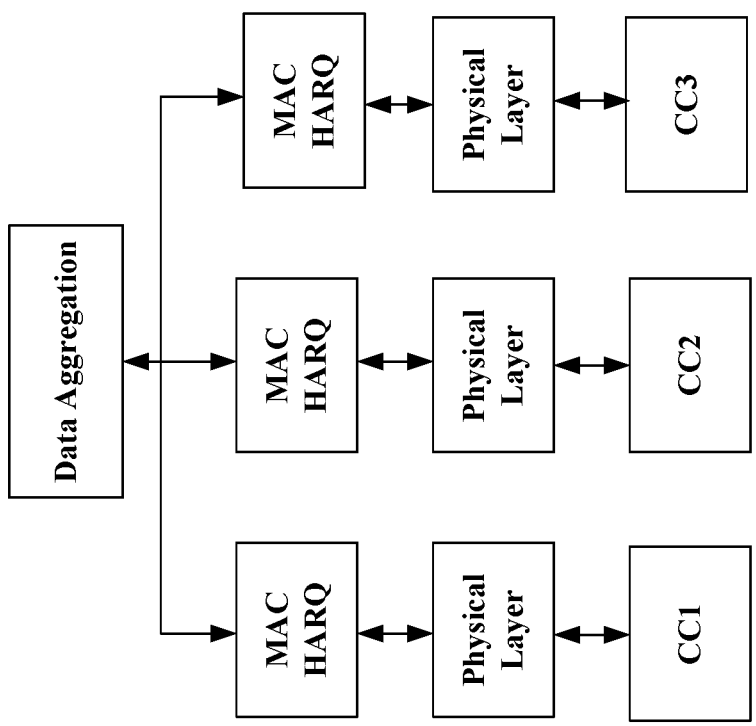
FIG. 5 is an example diagram of MAC layer data aggregation.

FIG. 5 illustrates aggregating transmission blocks from different component carriers at the MAC layer for an IMT-Advanced system. With MAC layer data aggregation, each component carrier has its own independent HARQ entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Asymmetric Carrier Aggregation

Figure 6:
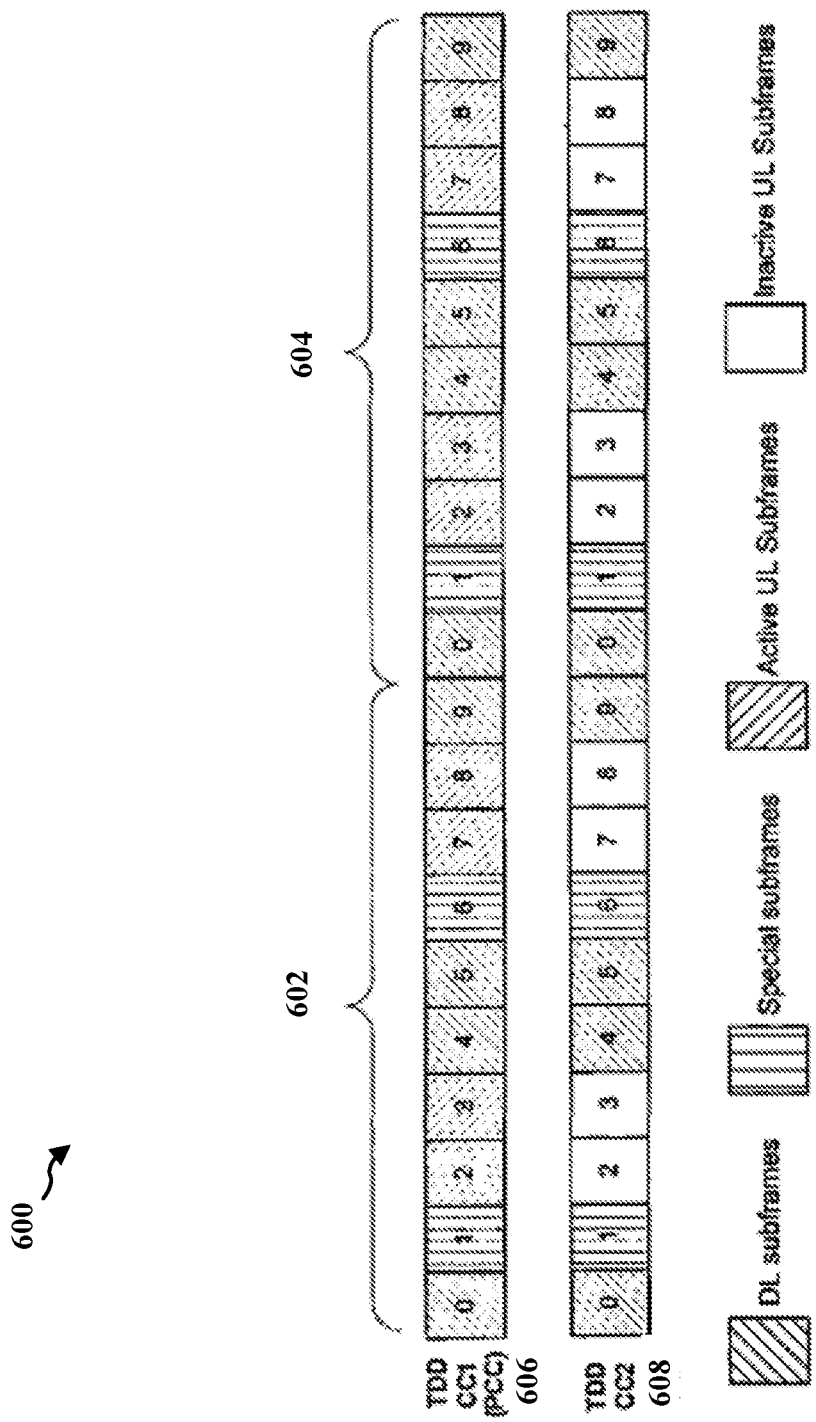
FIG. 6 illustrates an example diagram of carrier aggregation configured asymmetrically in a TDD implementation.

Some UEs may be configured with asymmetric CA in which a number of uplink carriers that is less than the number of downlink component carriers. For example, there may be multiple downlink component carriers, but only a single uplink component carrier. FIG. 6 is a block diagram illustrating carrier aggregation 600 configured asymmetrically in a TDD implementation. The transmission stream of FIG. 6 shows two radio frames, radio frames 602, 604, of a PCC 606 and SCC 608. PCC 604 is time division duplexed across its subframes to include downlink subframes, uplink subframes, and special (S) subframes SCC 608 is time division duplexed across its subframes to include downlink subframes, inactive uplink subframes for which the UE is not configured, and S subframes. Because the uplink subframes 2-3 and 7-8 of SCC 608 are inactive, the downlink subframes, subframes 0, 4-5, and 9, of SCC 608 are non-paired, and carrier aggregation 600 is considered to be asymmetric.

For the non-paired downlink CC in asymmetric carrier aggregations, also referred to as a "downlink-only" CC, there is no uplink portion of the CC configured for the UE to use for SRS transmission. However, SRS transmissions could still be useful for operation. With downlink-only CCs, the benefit of SRS normally wouldn't be available and the network would have to rely on CSI reports for the downlink-only CCs. However, as the number of CCs grows, this can create significant overhead. Aspects presented in this application address this problem through the use of limited SRS transmission on unused/unconfigured/inactive uplink subframes of the TDD, downlink-only carrier. Aspects presented herein provide a way to manage such SRS limited transmissions on a downlink-only CC when collisions with activity on configured carriers may arise. Aspects presented herein also improve reporting efficiency for several SRS signals or several UEs transmitting SRS.

In each of these circumstances, SRS would be useful, but, without an active uplink component carrier to be paired with the non-paired downlink component carriers, SRS may not be provided according to the usual mechanisms.

To provide SRS signaling to such downlink CCs, SRS may be enabled for the downlink CCs while maintaining a single, or a small number of, CC transmissions at a time in order to prevent simultaneous transmissions over a number of CCs that exceeds the UE capability. For example, a single uplink CC may be supported at a time by a UE. It may be desirable to maintain a single carrier waveform for the single CC transmissions to keep lower transmission complexity. The SRS transmissions may be time division multiplexed (TDM) over different CCs. Furthermore, it may be possible to enable non-single carrier waveform transmission over one or more CCs, e.g., by allowing parallel uplink transmissions over two or more CCs, at the expense of additional complexity.

Figure 7A:
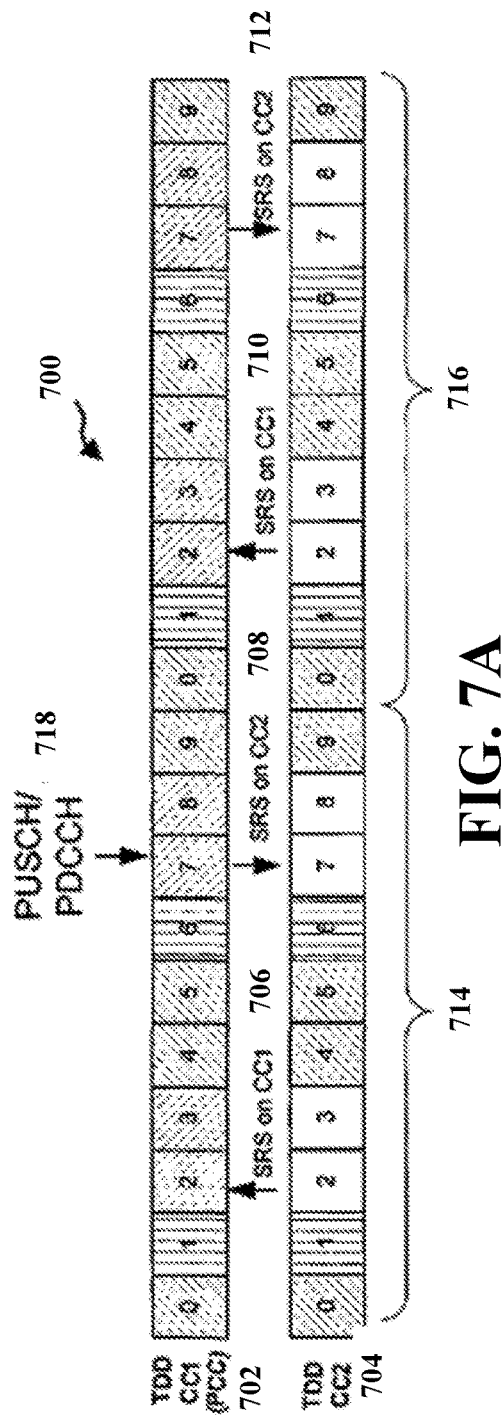
FIGS. 7A and 7B illustrate an example of carrier aggregation with SRS signaling.

FIG. 7A is a block diagram illustrating carrier aggregation 700 with SRS signaling configured according to one aspect of the present disclosure. Carrier aggregation 700 includes TDD PCC 702 and TDD component carrier 704. The SRS transmissions may be split between component carriers, TDD PCC 702 and TDD component carrier 704. For example, SRS 706 is transmitted at subframe 2 of radio frame 714 on TDD PCC 702, SRS 708 is transmitted at subframe 7 of radio frame 714 on TDD component carrier 704, SRS 710 is transmitted at subframe 2 of radio frame 716 on TDD PCC 702, and SRS 712 is transmitted at subframe 7 of radio frame 716 on TDD component carrier 704. In this manner, SRS 708 and 712 may be used to determine the channel quality for the non-paired downlink component carrier.

Thus, the UE may use the inactive uplink portions of a downlink CC, e.g. CC2, to transmit SRS to the eNB. Although examples are described using the term "eNB," an eNB is only one example of a base station. The aspects described herein may also be applied with a 5G base station, e.g., a gNB. The carrier aggregation configuration for CC2 includes downlink portions and excludes, or does not configure, uplink portions of CC2 for use by UE. For example, CC2 may not be configured for data transmission on PUSCH. Thus, CC2 may also be referred to as a downlink only CC, because the UE has been configured for downlink on CC2 without being configured for uplink data transmissions on CC2. However, the UE may additionally be configured to use at least a portion of the inactive, or unconfigured, uplink portions of CC2 to transmit SRS. The UE may use this inactive uplink portion of CC2, e.g., for SRS transmissions without transmitting PUSCH, CSI, etc. on CC2. Such additional transmissions might place an undue burden on the available resources. Transmitting the SRS may provide an eNB information about the channel using a minimal amount of overhead. The SRS may be only a few symbols wide in an area defined for the UE by the eNB.

The SRS transmission on CC2 may cause an interruption in another uplink CC. For example, the SRS transmission on the inactive portion of CC2 may at least partially overlap another scheduled uplink transmission on a different CC. This may be called a collision. The UE might only be capable of transmitting or receiving using one CC at a time.

In one example, a collision may be defined as two or more transmissions in the same subframe. In another example, a collision may also be defined as two or more transmissions in the same symbol. For the former, it implies that simultaneous transmissions over two or more component carriers are not allowed, even if the transmissions may happen over different symbols in the same subframe and within each symbol there is only one transmission in the same subframe. For the latter, it implies that it is possible to have two or more transmissions in the same subframe, as long as within each symbol there is only one transmission in the same subframe. For example, PUSCH/PUCCH 718 is scheduled for subframe 7 of radio frame 714 on CC1 702. However, SRS 708 is also scheduled for transmission on the same subframe 7 of radio frame 714, but on TDD CC 704. If both transmissions were allowed to proceed, there would be simultaneous transmission from the UE on two separate CCs. When such a collision event is identified, the UE may adjust the transmission of SRS 708 or of PUSCH/PDCCH 718 to maintain a single transmission at subframe 7 of radio frame 714, thus, avoiding dynamic switching of uplink component carrier transmissions within the same subframe.

Although this example is described showing a collision between the UE transmitting an uplink transmission on CC1 and transmitting SRS on CC2, a collision may similarly occur between the UE transmitting SRS on CC2, e.g., at 708 or 712 and receiving a downlink transmission. When this occurs, the UE may determine whether to adjust the transmission of the SRS or to adjust its reception of the downlink transmission in order to address the collision.

Figure 7B:
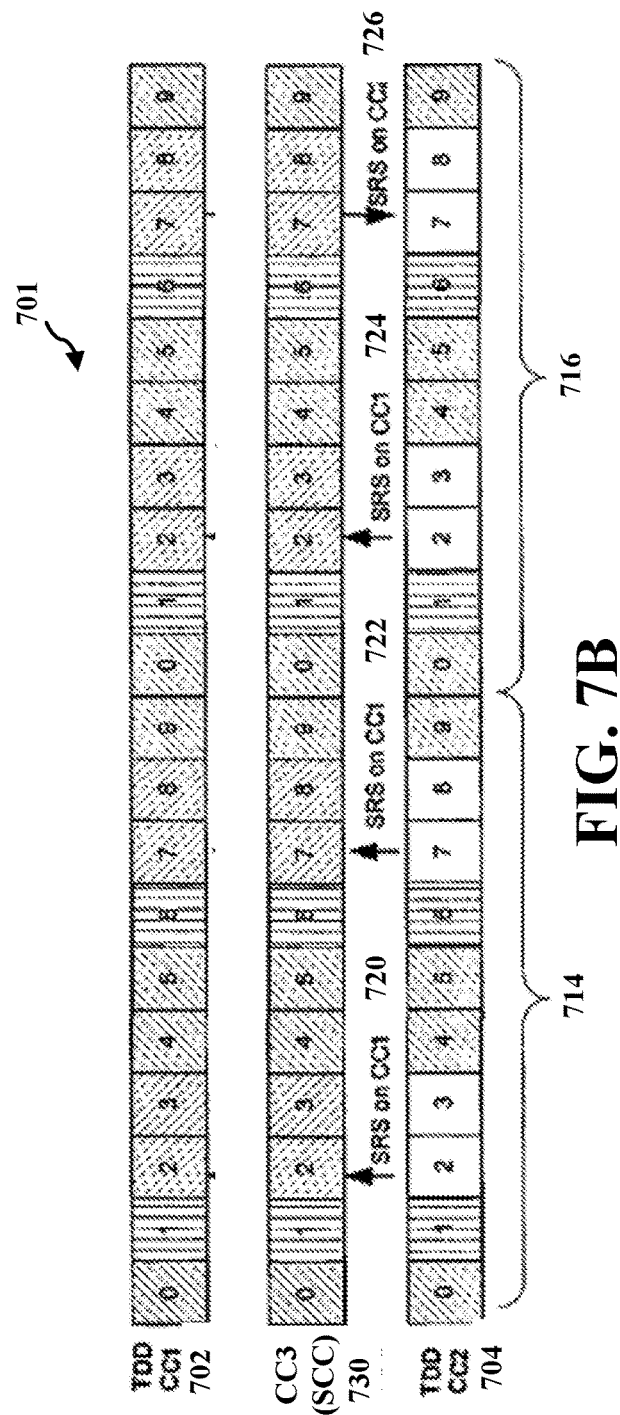

The SRS transmissions may be split in any number of divisions between component carriers. The configuration and/or activation of SRS transmissions can be jointly or separately managed among component carriers. As an example, two separate configurations of SRS transmissions can be provided to a user equipment for two component carriers, where the two configurations may or may not have overlapped SRS transmission instances. The carrier aggregation 700 illustrates a uniform split among the component carriers. However, non-uniform divisions are also contemplated in various alternative aspects. FIG. 7B is a block diagram illustrating carrier aggregation 701 with SRS signaling configured according to one aspect of the present disclosure. Carrier aggregation 701 illustrates two radio frames, radio frames 714 and 716, of component carriers TDD PCC 702 and TDD component carrier 704. SRS transmissions are scheduled in a non-uniform division that sounds more frequently on TDD PCC 702. SRS transmissions 720, 722, 724 on TDD PCC 702 are made on subframes 2 and 7 of radio frame 714 and on subframe 2 of radio frame 716. TDD component carrier 704 is sounded with SRS transmission 726 on subframe 7 of radio frame 716.

In order to transmit the SRS during the inactive uplink portion of DL CC2, the UE may need to switch, also referred to herein as "retune", from a different CC. The switch may be from an uplink transmission, e.g., on CC1, or potentially a switch from a different CC that is configured to receive a downlink transmission during the period of time that the UE will transmit the SRS resulting in an interruption of the other transmission.

FIG. 7B also illustrates that the SRS transmission 726 has the potential to collide with uplink transmissions on a third CC, CC3 730. When this occurs, the UE may need to determine which CC, CC1 or CC3, to interrupt in order to transmit SRS.

Interruption Time

UEs with the capability of supporting more downlink carriers than uplink carriers may be configured to use an inactive, or unconfigured, uplink portion of a TDD CC that is configured in carrier aggregation for downlink-only operation to facilitate transmission of an SRS. The UE may need to switch from one CC in order to transmit the SRS transmission in the unconfigured uplink portion of the downlink-only TDD CC. For example, in FIG. 7A, the UE may switch or tune its transmitter away from CC1 in order to transmit SRS 708, 712 on an unconfigured uplink portion of CC2. This may cause an interruption to CC1, affecting both downlink and uplink traffic due to interruption of PUCCH, PUSCH, etc. on CC1. Such interruptions may potentially impact data rates and control transmissions in CC1 as well as downlink data rates of other CCs. The interruption time may vary, e.g., depending on whether the UE may need to perform inter-band switching or intra-band switching.

The UE may determine that a transmission of an SRS in an uplink portion of CC2 would at least partially collide with an uplink transmission and/or reception of a downlink transmission on another CC. For example, the UE may determine that transmission of SRS 708 would collide with PUSCH/PDCCH 718 in FIG. 7A. In another example, the UE may determine that transmission of an SRS would collide with reception of a scheduled downlink transmission from an eNB. For example, if TDD carriers, CC1 and CC2, are configured in intra-band CA and each has a different UL/DL subframe configuration, then transmission of SRS on an unconfigured portion of CC1 could impair the ability to receive a downlink transmission on CC2. When the UE identifies the collision, the UE may determine to adjust at least one of the uplink transmission, the SRS transmission, or reception of the downlink transmission based on the determination of the collision and based on an interruption time to transmit the SRS in the unconfigured uplink portion of CC1.

The UE may apply a dropping rule, in which the UE determines to adjust the SRS transmission by dropping the SRS transmission when the SRS transmission could collide with a PUCCH transmission on another CC. The UE may then proceed with transmitting the PUCCH transmission without switching to transmit the SRS.

The UE may determine to refrain from receiving at least a portion of the downlink transmission when the UE determines that the SRS would collide at least partially with the downlink transmission. The UE may switch from a first CC on which it receives the downlink transmission to transmit the SRS on a second CC. The UE may switch back to the first CC to continue reception of the downlink transmission.

When the UE identifies a collision between the SRS and an uplink transmission on another CC, the UE may determine to adjust the uplink transmission on the other CC to a subset of uplink symbols of the subframe in order to avoid the collision between the SRS and the uplink transmission.

To avoid collision of PUCCH with SRS, the UE may restrict the PUCCH transmission to a subset of the uplink subframes. For example, the UE may use a reference subframe configuration for PUCCH transmission, which may be the same as or separate from an enhanced interference mitigation and traffic adaptation (eIMTA) configuration. For example, if eIMTA is configured, the UE may follow the eIMTA reference subframe configuration. If eIMTA is not configured, a different subframe configuration may be signaled separately.

When the UE would need to simultaneously transmit on two CCs, e.g., to transmit SRS on CC2 and an uplink transmission on CC1, and the UE is not capable of simultaneous transmissions on two CCs, the UE may determine whether to transmit the SRS or to transmit the uplink transmission based on at least one prioritization rule.

In a first example, a priority rule may be established that provides a respective priority level based on the information to be sent in a transmission. For example, a prioritization rule may indicate that a Pcell PRACH has a higher priority that an Scell PRACH, which has a higher priority than an ACK/NACK/SR. The prioritization rule may indicate that an ACK/NACK/SR has a greater priority than an CSI, whether periodic or aperiodic. In another example, the type of CSI may affect the priority level of the CSI. The prioritization rule may indicate that the CSI has a higher priority than PUSCH, which has a higher priority than SRS. In one example, a prioritization rule may indicate the priority levels of information as being:

Priority=Pcell PRACH>Scell PRACH>Ack/Nack/SR>CSI>PUSCH>SRS.

A prioritization rule may be different for different channels. For example, for a different channel, a different prioritization rule may be:

Priority=Pcell PRACH>Scell PRACH>PUCCH>PUSCH>SRS.

In a second example, a UE may determine to transmit both the SRS and the uplink transmission. The UE may adjust the uplink transmission by puncturing or rate matching at least a portion of the symbols of the uplink transmission to facilitate switching, depending on the amount of time required to switch from one CC to another CC. For example, when the UE switches from an uplink transmission to transmit an SRS, a portion of the uplink transmission's symbols may not be available, e.g., for PUSCH or PUCCH, in order to facilitate the switching.

The UE may determine to puncture or rate match a portion of the uplink transmission when, e.g., the interruption or switching time to switch to the CC for transmission of the SRS, is below a threshold amount. The determination regarding puncturing the uplink transmission may also be based on the type of the uplink transmission. For example, if 1 symbol is needed for switching and the uplink transmission comprises PUSCH, then the SRS transmission may be transmitted by shortening the PUSCH transmission and puncturing the PUSCH with the SRS transmission and the switching time. If a longer time is needed for switching (e.g. 1 subframe) the whole PUSCH may be dropped.

Figures 8A, 8B:
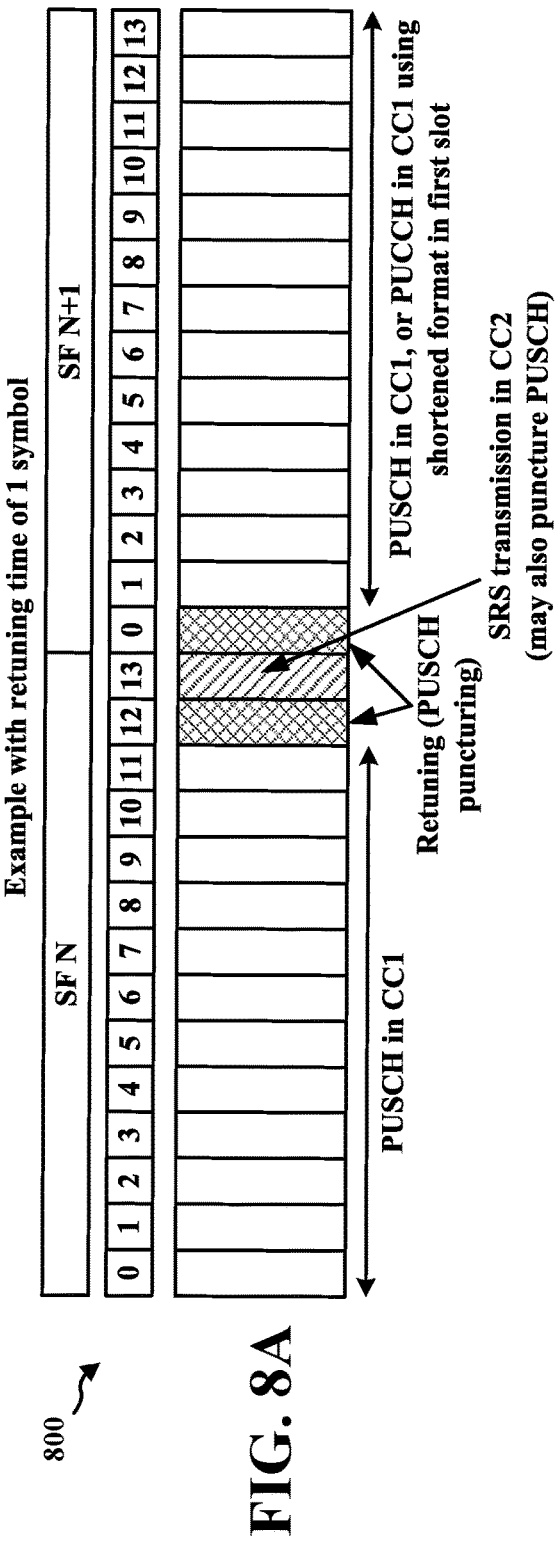
FIGS. 8A and 8B illustrate an example of puncturing an uplink transmission with an SRS transmission and shortening an uplink transmission.

When a PUCCH is affected, a shortened format may be used. Thus, the PUCCH may be transmitted in the same subframe as the SRS using a shortened PUCCH format. The SRS may be transmitted in the last symbol of the subframe, as illustrated in FIGS. 8A and 8B. The shortened format of PUCCH may occupy fewer than all fourteen symbols in a subframe. When configured not to interfere with SRS transmissions, the shortened form PUCCH may be transmitted in the same subframe as the SRS transmission. For example, a shortened format may be used for a first slot of the PUCCH. In another example, PUCCH may use only 1 slot for transmission.

FIGS. 8A and 8B illustrate examples of a PUSCH being punctured with an SRS transmission. In FIG. 8A, a PUSCH is punctured at symbol 12 to allow for switching, or retuning, to CC2 for transmission of the SRS. Another PUSCH is punctured at symbol 0 in order to facilitate switching, or retuning, from CC2 back to CC1 for the PUSCH. FIG. 8A also shows that a PUCCH may be adjusted to use a shortened format in the first slot in order to allow for retuning from CC2 for the SRS transmission. In FIG. 8A, the retuning time is 1 symbol. FIG. 8B illustrates an example with a retuning time of less than 1 symbol. For example, the retuning time may be around 20 μs. In FIG. 8B, the SRS transmission at CC2 may start transmitting after the 20 μs, so that a portion of the symbol is not transmitted by the UE.

In a third example, a UE may select between using a prioritization rule and using puncturing. The selection may be based on an amount of interruption time required. The selection may be based on a capability of the UE. The selection may be based on instructions received from the eNB. The selection may be based on whether the retuning involves an intra-band switch or an inter-band switch.

For example, if the retuning is intra-band, the UE may determine that 1 symbol or less is required for retuning and may determine to use puncturing symbols of the uplink transmission. If the retuning is inter-band, the UE may determine that more than multiple symbols may be required for retuning and may determine to use a prioritization rule to determine whether to transmit the SRS or the uplink transmission.

Different UEs may have different capabilities which lead to different interruption times. The interruption time may vary across different UEs, as different UE implementations may lead to different switching times. The interruption time may vary for the same UE, depending on the band/frequency location of the two CCs involved in the switching. Thus, determination on how to adjust the SRS or uplink transmission, e.g., using prioritization rules, puncturing, etc. may depend on the capability of the UE or on the band/frequency of the CCs involved.

The UE may also report information, such as a UE capability, to an eNB. The eNB may transmit instructions to the UE for use in determining how to adjust the SRS transmission or the uplink transmission. For example, the UE may indicate to the eNB that it requires a long switching time or a short switching time. Based on this indication, the eNB may return an indication to the UE as to whether the UE should use a prioritization rule and/or puncturing in order to determine whether and/or how to transmit the SRS.

A set of switching times may be defined in a specification, e.g., according to UE capability and/or bands/channels involved in the switching. The UE may then apply a switching time based on UE capability signaling and the CCs that will be involved in the switching.

Determining Among Component Carriers to Interrupt

The UE may be capable of transmitting or receiving using multiple CCs. For example, a UE may be capable of uplink transmissions on two CCs at the same time. FIG. 7B illustrates an example where the UE is configured for uplink transmissions on both CC1 and CC3. The UE may be capable of simultaneously transmitting on multiple CCs. For example, the UE may be capable of simultaneously transmitting on two CCs. In this example, when an SRS on CC2 would collide with at least part of uplink transmissions on both CC1 and CC3, the UE may need to determine which CC to interrupt in order to transmit the SRS on CC2. The UE may make this selection in any of a number of ways.

In a first option, the UE may determine whether to interrupt the uplink transmission on CC1 or CC3 based on a carrier number, also referred to herein as a CC index. Lower carrier numbers may have a higher priority. Thus, the UE may determine to interrupt the carrier with the higher carrier number. If more than two CCs are involved in the determination, the UE may determine to interrupt the carrier with the highest carrier number. For example, if the UE is configured with carrier number "CC0" (Pcell) and "CC1" (Scell), and will be switching to a third carrier to transmit SRS, the UE may determine to interrupt CC1 in order to switch to the third carrier for transmission of the SRS, because the CC index 1 is higher than 0. The UE may also transmit this information, with or without UE capability, to the eNB. The UE may consider UE capability in making this determination, as well. For example, if the UE will transmit SRS on a downlink CC, and switching is possible from a subset of uplink CCs, the UE may select the CC from within the subset that has the lower CC index number.

In a second option, the UE may determine whether to interrupt the uplink transmission on CC1 or CC3 based on the channel or the information being sent. The UE may apply a prioritization rule similar to those presented in determining whether to transmit the uplink transmission or SRS. However, the prioritization rule may be applied to determine what information has a higher priority and therefore should not be interrupted to transmit the SRS. The CC having the lower priority information may then be selected for switching to CC2 to transmit the SRS. For example, if an ACK is going to be transmitted in CC1 and PUSCH will be transmitted in CC3, the UE may determine to interrupt the PUSCH of CC3 in order to transmit the SRS on CC2. If the same type of information is being transmitted on both CCs, the UE may then select between the two CCs based on the carrier number, as described in the first option. For example, if both CC1 and CC3 will transmit PUSCH, the UE may interrupt the carrier with a higher index number.

In a third option, the UE may determine whether to interrupt the uplink transmission on CC1 or CC3 based on an exchange of messages between the UE and the eNB. The UE may transmit information to the eNB indicating its CA capability. This information may include which CCs the UE may switch among. For example, the UE may be able to switch between CC1 and CC2 of FIG. 7B but not between CC3 and CC2. The eNB may use the CA capability of the UE and the additional information to configure the UE with a source CC and a target CC for switching. For example, the eNB might configure the UE for switching between CC1 to CC2 and between CC3 and CC4, where CC1 and CC3 are uplink CC and CC2 and CC4 are downlink CC used for the transmission of SRS. The eNB may also return a subset of CCs from which the UE should determine to switch. Therefore, the UE may determine how/when to switch among carriers based on an indication signaled to the UE.

Sounding Multiple Component Carriers

The UE may need to sound a number of carriers. As described above, UE may be configured with a larger number of downlink CCs than uplink CCs. In one example, the UE may be configured with a ratio of 5 downlink CCs to 1 uplink CC. It may be helpful for the UE to be able to sound the multiple downlink CCs in a reduced amount of time. For example, a UE may want to sound 6 CCs in 1 ms. This sounding may require switching between multiple carriers. If the UE is limited to 1 SRS per subframe, it make take an undesirable amount of time to sound all of the carriers.

For power limited UEs, wideband sounding may be performed, but may undesirably reduce SNR. While narrowband SRS transmissions may be used, such narrowband SRSs may require multiple switches by the UE and/or multiple transmissions per carrier in order to sound the whole bandwidth. Therefore, narrowband SRSs with multiple switches might not be efficient.

In order to overcome these challenges, the UE may transmit multiple SRSs per subframe. The SRS transmissions may be in different CCs, and therefore may require retuning. The SRS transmissions may be in different subbands of the same CC. The SRS transmissions may be repetitions in the same subband of the same CC. The configuration of the SRS transmissions may be different. For example, the bandwidth, frequency, location, cyclic shift, comb, etc. may be different for different SRS transmissions within the same subframe. The SRS transmissions may be staggered across subbands or across carriers. The eNB may configure the UE to stagger the SRS transmissions. The eNB may configure multiple UEs with staggered SRS transmissions so that the UEs can efficiently reuse retuning times.

Figure 9:
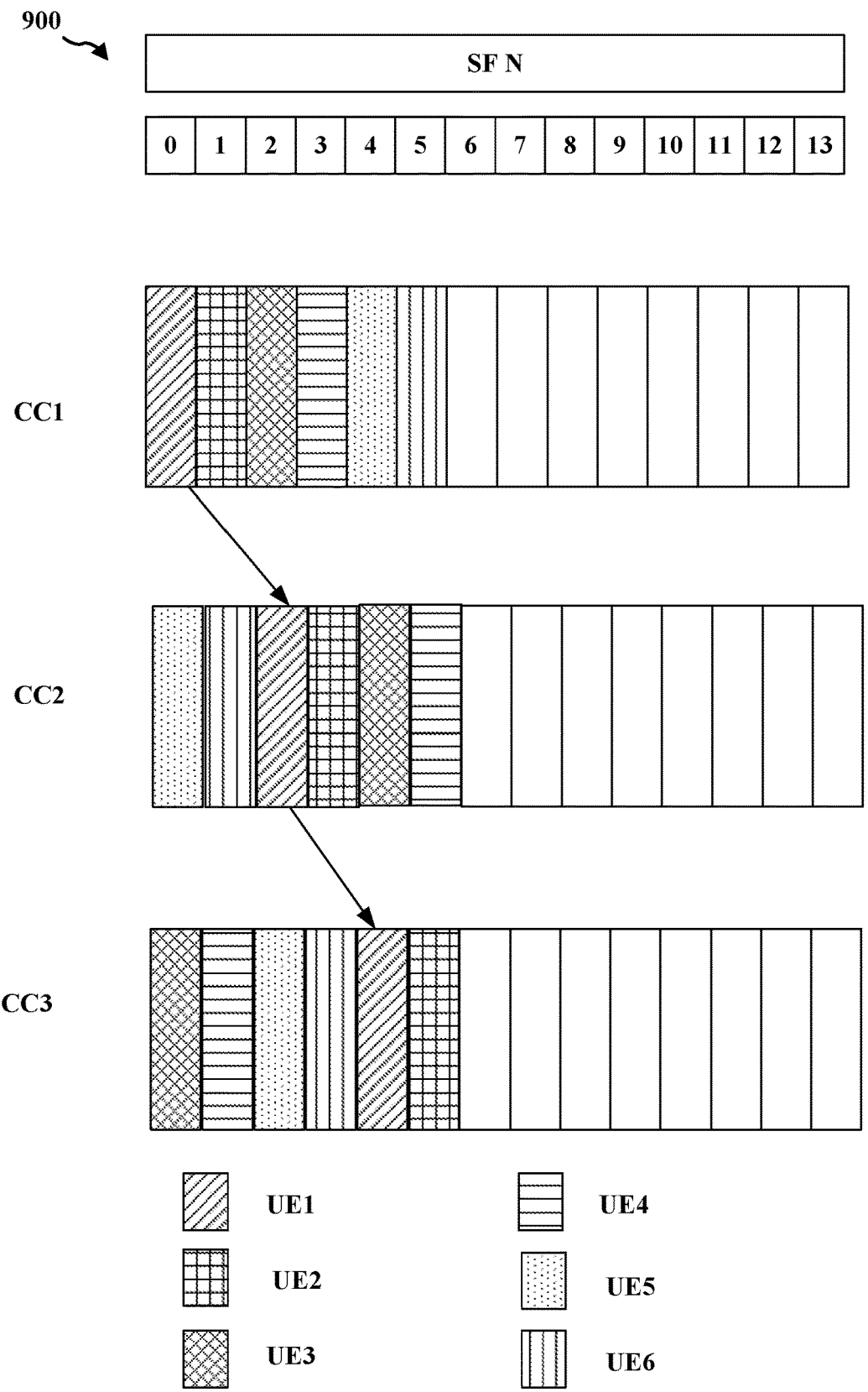
FIG. 9 illustrates an example staggered SRS transmission pattern.

FIG. 9 illustrates a diagram 900 showing a staggered pattern of narrowband sounding in which each of a plurality of UEs transmit SRSs in a staggered pattern for 3 CCs. The eNB may have configured the UEs so that the SRS transmission of one UE is aligned with the retuning of a different UE. This allows multiple UEs to sound the three CCs in an efficient manner. The eNB has configured the UEs so that transmission resources are not wasted while the UEs retune to the next CC.

Figure 10:
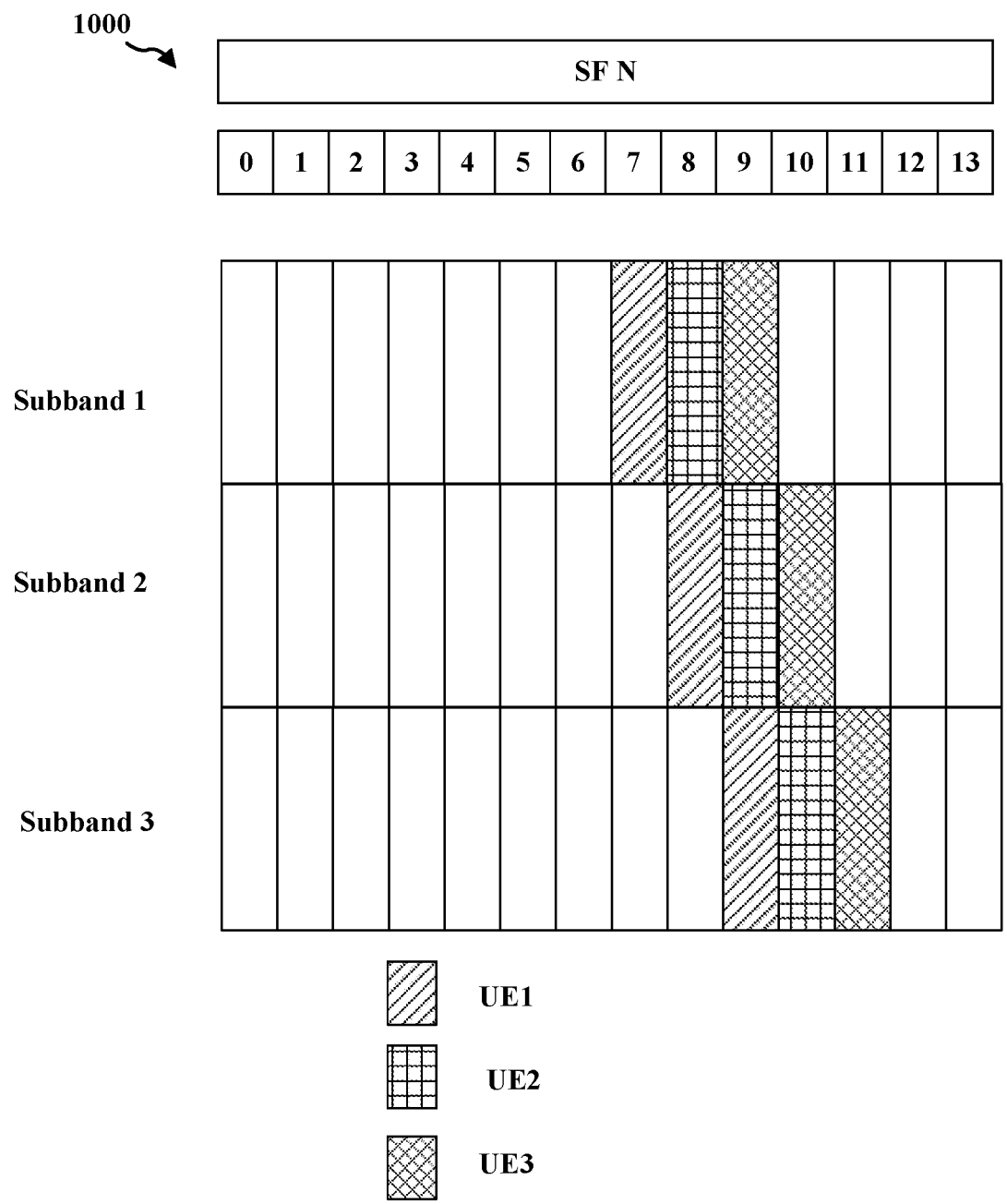
FIG. 10 illustrates an example staggered SRS transmission pattern.

When no retuning is required, the UEs may be staggered in a different manner. FIG. 10 illustrates an example diagram 1000 of narrowband sounding for 3 subbands when retuning is not required. In this example, UE 1 may transmit an SRS in symbol 7 for subband 1, at symbol 8 for subband 2, and at symbol 9 for subband 3. Similarly, UE 2 and UE 3 may also transmit their SRSs in a staggered manner at adjacent symbols for the next subband. The staggered pattern used by UE1, UE2, and UE3 may be configured by the eNB.

Figure 11:
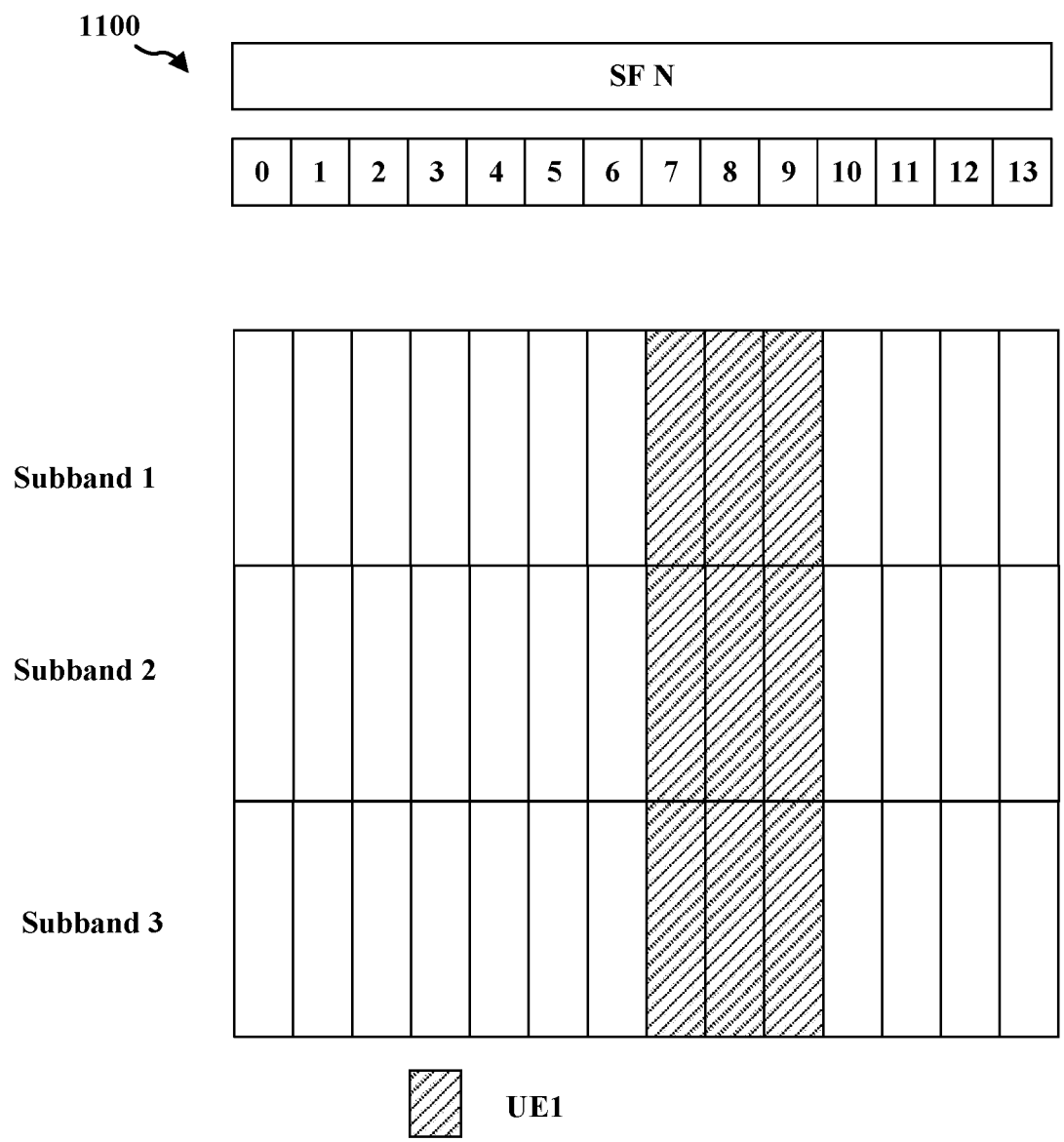
FIG. 11 illustrates an example wideband SRS transmission pattern.

FIG. 11 illustrates a diagram 1100 of wideband sounding. For wideband sounding, the UE may transmit more than one SRS in the subframe by repeating the same wideband SRS. Although this example illustrates the repetition of a wideband SRS, the repetition may also be for a subband SRS.

The UE may be configured to transmit the SRSs using a cover code. This allows multiple UEs to be multiplexed so that more UEs can sound the wideband/subbands. For example, repetitions may be multiplied by [1,1] for a first UE and by [1, −1] for a second UE. Different shifts/combs may be used by the UE in different symbols.

Figure 12:
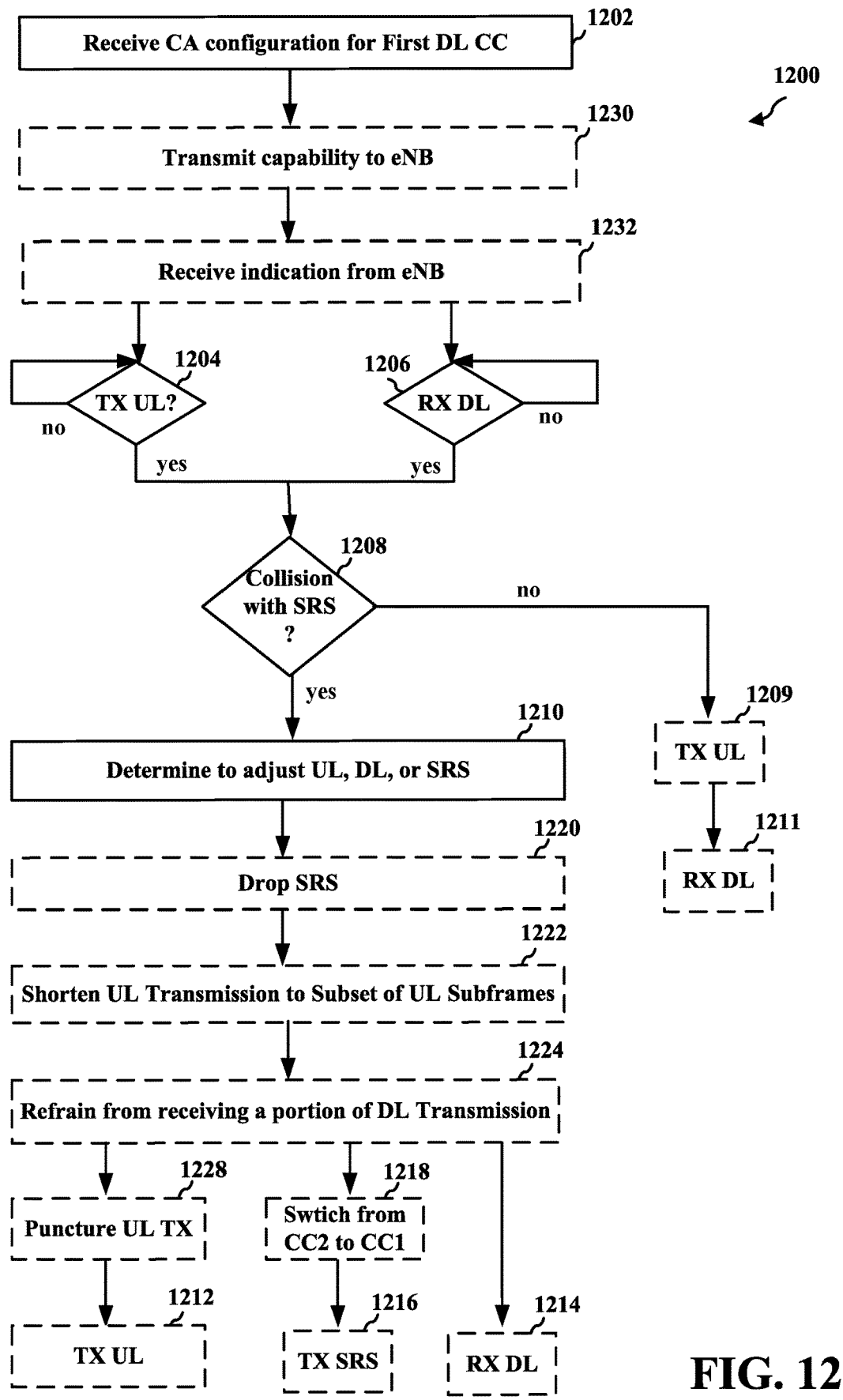
FIG. 12 is a flowchart of a method of wireless communication.

FIG. 12 is a flowchart 1200 of a method of wireless communication. The method may be performed by a UE (e.g., the UE 104, 350, the apparatus 1602/1602'). At 1202, the UE receives a CA configuration for a first CC and a second CC, the first CC being a TDD CC, the CA configuration including downlink portions and excluding uplink portions of the first CC for data transmission by the UE. Thus, the first CC may be referred to as a downlink only CC, a CC for which the UE is unconfigured for portions of the uplink, or a CC for which the uplink portions are inactive.

At 1204, the UE determines whether to transmit an uplink transmission on a second CC in a subframe, at 1206 the UE determines whether to receive a downlink transmission in the subframe on the second CC.

When the UE has determined to transmit an uplink transmission at 1204 or to receive a downlink transmission at 1206, the UE determines, at 1208, whether a transmission of an SRS in an uplink portion of the first CC would at least partially collide in the subframe with one of the uplink transmission from 1204 or the downlink transmission from 1206. If the UE does not determine that a collision would occur, the UE transmits the uplink transmission at 1209 or receives the downlink transmission at 1211.

When the UE determines that the transmission of the SRS in the uplink portion of the first CC would at least partially collide with the uplink transmission or reception of the downlink transmission, the UE determines at 1210 to adjust at least one of the uplink transmission, the SRS transmission, or reception of the downlink transmission based on the determination of the collision and an interruption time to transmit the SRS in the uplink portion of the first CC. The interruption time may comprise, e.g., an amount of time required to switch from the second CC to the first CC in order transmit the SRS.

After determining the adjustment to be made, the UE then performs at least one of transmitting the uplink transmission on the second CC at 1212, receiving the downlink transmission on the second CC at 1214, or transmitting the SRS at 1216 in the uplink portion of the first CC based on the determination to adjust. The transmission of the SRS in the uplink portion of the first CC, at 1216, may include switching, at 1218, from the second CC to the first CC. Thus, the interruption time may be based on the interruption time due to switching from the second CC to the first CC to transmit the SRS.

The UE may adjust the transmission of the SRS in the uplink portion of the first CC by dropping the transmission of the SRS at 1220 when the SRS would at least partially collide with the uplink transmission on the second CC. The UE may then transmit the uplink transmission on the second CC.

The UE may adjust the uplink transmission by shortening the uplink transmission on the second CC at 1222 to a subset of uplink symbols of the subframe or a subset of subframes when the SRS transmission in the uplink portion of the first CC would at least partially collide with the uplink transmission on the second CC and when the interruption time meets a threshold. The UE may then transmit the SRS at 1216 and transmit the adjusted/limited uplink transmission at 1212. The UE may puncture the uplink transmission on the second CC at 1228 with the SRS transmission in the uplink portion of the first CC when the interruption time meets the threshold. The uplink transmission on the second CC at 1212 may comprise a shortened uplink format to accommodate the puncturing transmission of the SRS in the subframe. The uplink transmission may comprise a PUSCH, so that the PUSCH transmission is limited to a subset of the uplink symbols of the subframe. A PUSCH may also be adjusted based, at least in part, on subframe configuration, or restriction, of the second CC. Thus, the PUSCH may be restricted to selected, configured, subframes of the second CC, or the PUSCH may use a shortened UCI format when the interruption time is below a threshold.

The UE may refrain from switching to the first CC to transmit the SRS when the SRS would at least partially collide with the uplink transmission on the second CC, wherein the performing comprises transmitting the uplink transmission on the second CC.

The UE may adjust reception of the downlink transmission by refraining from receiving at least a portion of the downlink transmission on the second CC at 1224 when the downlink transmission would at least partially collide with the SRS. The UE may then transmit the SRS in the uplink portion of the first CC at 1216.

In determining to adjust at 1210, the UE determine whether to transmit the SRS in the uplink portion of the first CC or to transmit the uplink transmission on the second CC based on at least one prioritization rule at 1226. The at least one prioritization rule may take into account at least one of whether the SRS transmission is a periodic SRS transmission or an aperiodic SRS, a channel type of the second CC, or a type of control information to be transmitted on the second CC. The channel type may be, e.g., PUCCH, PUSCH, PRACH, etc. The type of control information may be ACK/NACK, CSI, etc.

The UE may optionally transmit a capability of the UE to an eNB at 1230 which may include, for example, an indication of its switching time and/or radio capabilities. At 1232, the UE may receive instructions regarding the transmission of the SRS. The UE may apply the instructions received from the eNB, e.g., at 1238 in FIG. 13, in the determining to adjust, at 1210, at least one of the uplink transmission, the SRS transmission, or reception of the downlink transmission based on the determination of the collision.

FIG. 13 illustrates possible additional details that may be included as a part of the determination to adjust at 1210. As illustrated in FIG. 13, as part of the determination at 1210, the UE may determine at 1236 whether to apply a prioritization rule or puncturing of the uplink transmission based on at least one of the interruption time for switching between the second CC and the first CC and a capability of the UE.

In another example, the instructions received at 1236 may include an indication to restrict subframes on which the UE should transmit a PUCCH to a subset of uplink subframes of the second CC. In this example, in determining whether to adjust the uplink transmission, the downlink transmission or the SRS, the UE may apply the instructions received at 1236 by restricting a PUCCH transmission to the subset of uplink subframes of the second CC based on the indication.

The UE may puncture the uplink transmission to transmit the SRS, e.g., at 1228 when a switch from the first CC to the second CC is intra-band. The UE may use a prioritization rule, e.g., at 1234, to determine the adjustment to make. For example, the UE may use a prioritization rule to determine whether to transmit the SRS or the uplink transmission when the switch from the first CC to the second CC is inter-band.

Figure 14:
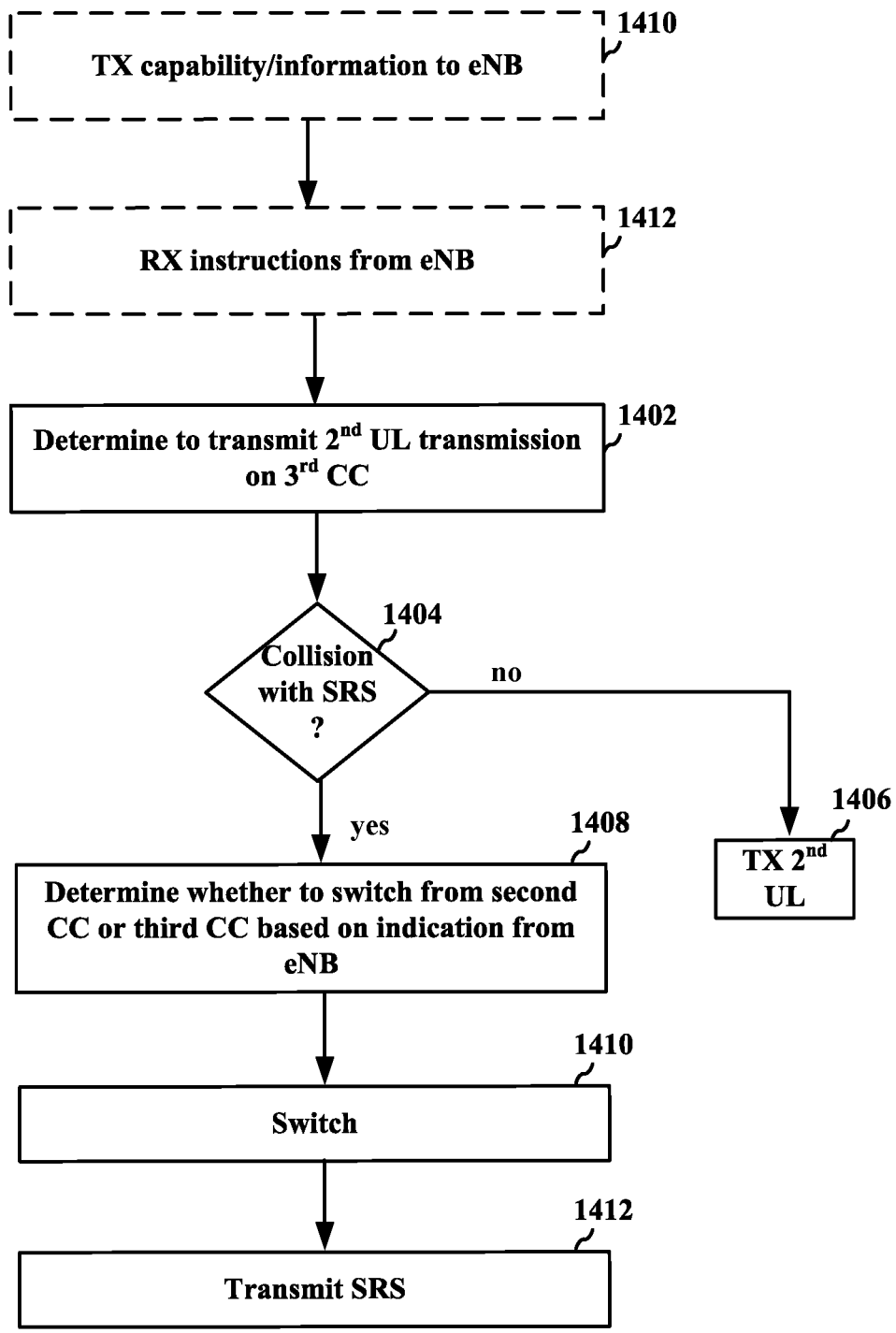
FIG. 14 is a flowchart of a method of wireless communication.

When the UE determines that the transmission of the SRS in the uplink portion of the first CC would at least partially collide with the uplink transmission on the second CC, at 1208, the UE may need to determine whether to switch from the second CC or a third CC in order to transmit the SRS. As illustrated at FIG. 14, the UE may determine to transmit a second uplink transmission on a third CC at 1402. The UE may determine at 1404 that the transmission of the SRS in the uplink portion of the first CC would at least partially collide with the second uplink transmission on the third CC. If the UE does not identify a collision between the SRS and the second uplink transmission, the UE may transmit the second uplink transmission at 1406. When the UE determines that a collision would occur, the UE may then determine at 1408 whether to switch from the uplink transmission on the second CC or the second uplink transmission on the third CC to transmit the SRS in the uplink portion of the first CC. The determination at 1408 may be based on at least one of a CC index of the second CC and a CC index of the third CC, content of the first uplink transmission and content the second uplink transmission, and an indication received from an eNB. For example, the determination of whether to switch from the second CC or from the third CC to transmit the SRS in the uplink portion of the first CC may be based on an indication received from the eNB at 1412. The UE may transmit a capability of the UE to the eNB at 1410, and the indication received from the eNB may be based on the capability of the UE. Although the transmission at 1410 and the reception of instructions at 1412 are illustrated as occurring before the UE determines that a collision will occur between the SRS and the second uplink transmission, this is one example of the order in which such communication may occur. The UE may transmit its capability and other information to the eNB and/or may receive instructions from the eNB after the identification of the collision as well as prior to determining to transmit the second uplink transmission at 1402. Aspects of FIG. 14 may be performed as a part of the method illustrated in FIG. 12.

Figure 15:
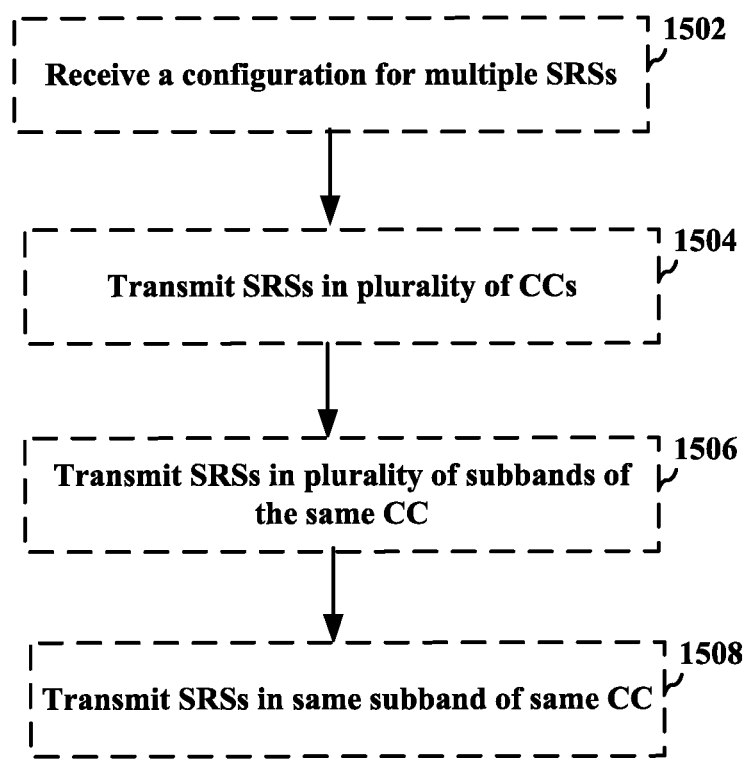
FIG. 15 is a flowchart of a method of wireless communication.

At times, the UE may need to transmit more than one SRS. FIG. 15 illustrates aspects in which the UE may transmit a plurality of SRSs, e.g., in order to sound a plurality of CCs, sound a plurality of subbands of the first CC, or to sound repetitions of a same subband of the first CC. The UE sounds the CCs/subbands by transmitting a plurality of SRSs in uplink portions of at least one TDD CC on which the UE is unconfigured for uplink communication. The UE may receive a configuration for transmitting the plurality of SRSs from an eNB at 1502. Using the received configuration, the UE may transmit the plurality of SRSs in uplink portions of at least one of a plurality of CCs at 1504, a plurality of subbands in the first CC at 1506, and a same subband of the first CC using SRS repetition at 1508. The UE may transmit the plurality of SRSs as staggered transmissions, as described in connection with FIGS. 9-11. The UE plurality of SRS may be transmitted within one symbol, for example. Aspects of FIG. 15 may be performed as a part of the method illustrated in FIG. 12.

Figure 16:
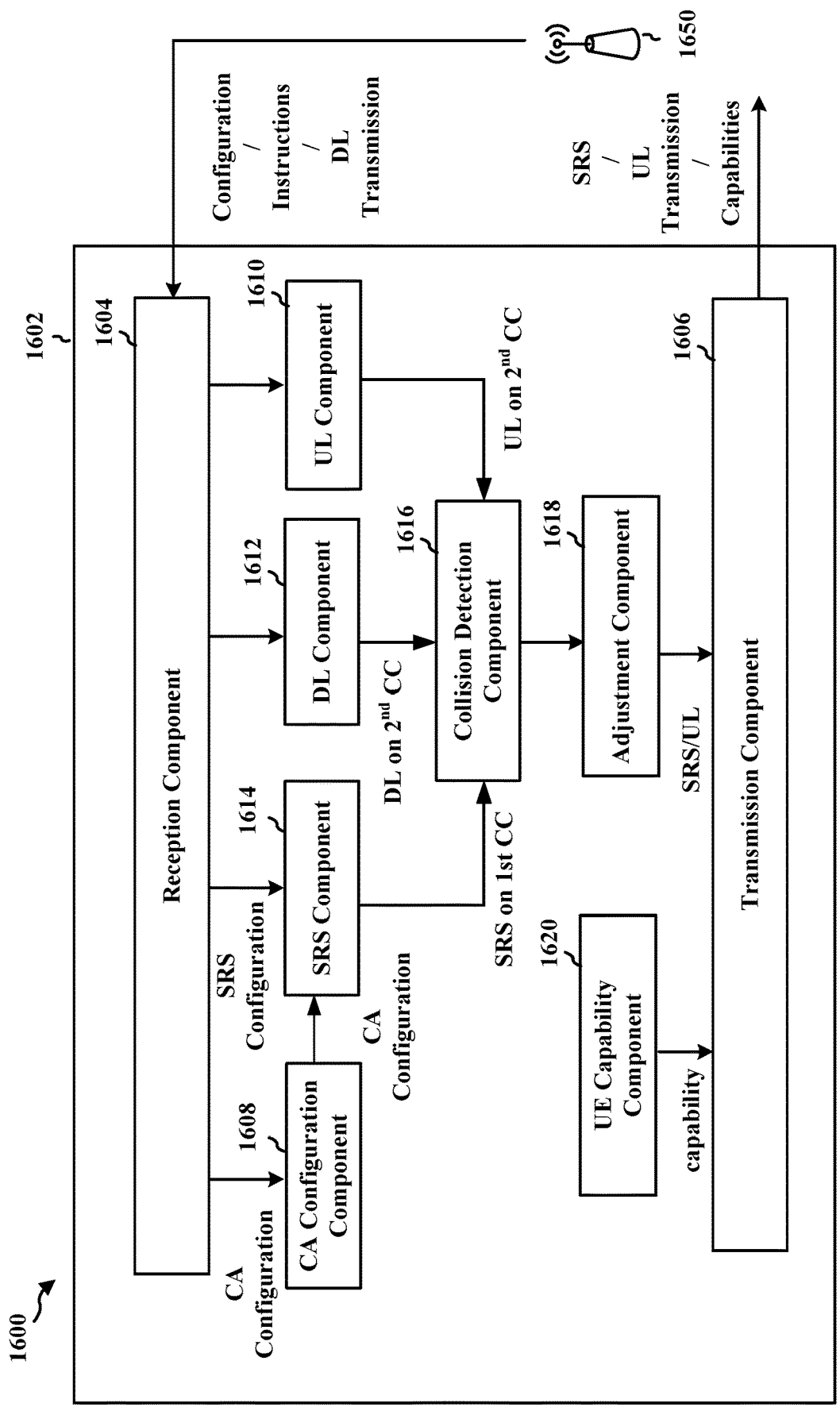
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a UE. The apparatus includes a reception component 1604 that receives downlink communication from a base station, e.g., eNB 1650, gNB, etc. Such downlink communication may include configuration information such as a CA configuration, instructions regarding transmitting SRS, and/or other downlink transmissions. The apparatus includes a transmission component 1606 that transmits uplink communication to eNB 1650. The uplink communication may include an SRS, capabilities of the UE, and/or other uplink transmissions. The apparatus includes a CA configuration component 1608 that receives a CA configuration for a first CC and a second CC, an uplink component 1610 that determines to transmit an uplink transmission, e.g., on the second CC, and a downlink component 1612 that determines to receive a downlink transmission from eNB 1650 on the second CC. The apparatus may include an SRS component 1614 that determines to transmit an SRS on an uplink portion of the first CC, the apparatus being configured for downlink communication on the first CC. The apparatus includes a collision detection component 1616 that determines that a transmission of an SRS in an uplink portion of the first CC would at least partially collide with an uplink transmission or reception of a downlink transmission on a second CC. The apparatus includes an adjustment component 1618 that determines to adjust at least one of the uplink transmission, the SRS transmission, or reception of the downlink transmission based on the determination of the collision. Based on the determination made by the adjustment component 1618, the transmission component transmits the uplink transmission on the second CC and/or transmits the SRS on the first CC, and/or the reception component receives the downlink transmission on the second CC. The apparatus may comprise a UE capability component 1620 configured to transmit a capability of the UE to eNB 1635. In response, the UE may receive an indication or instructions from the eNB regarding the transmission of the SRS, regarding switching, etc.

The apparatus may include additional components that perform each of the blocks of the algorithm in the aforementioned flowcharts of FIGS. 12-15. As such, each block in the aforementioned flowcharts of FIGS. 12-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
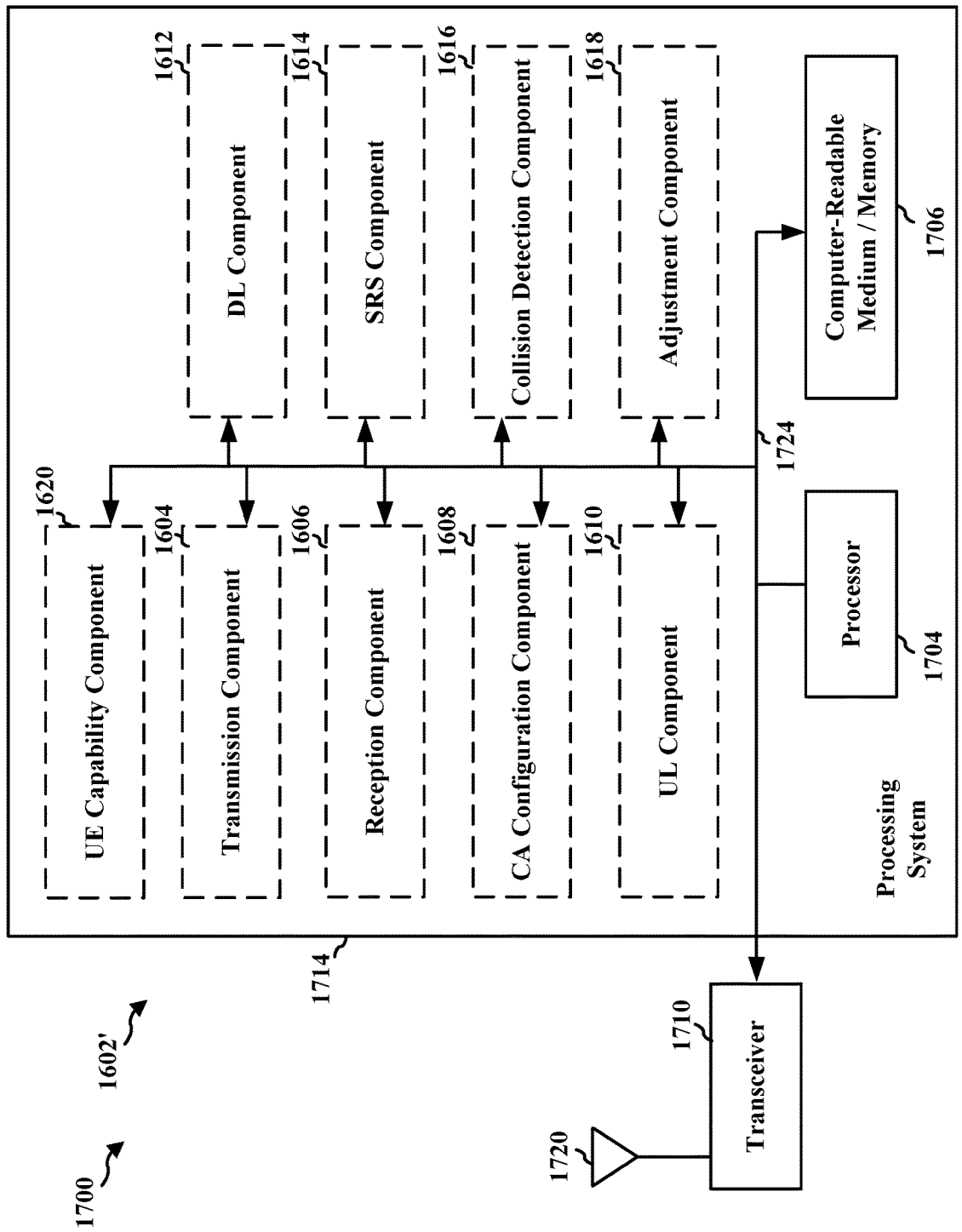
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, 1618, and 1620, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616, 1618, and 1620. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for receiving a CA configuration for a first CC and a second CC, the first CC being a TDD CC, the CA configuration including downlink portions and excluding uplink portions of the first CC for use by the UE; means for determining one of to transmit an uplink transmission on the second CC in a subframe or to receive a downlink transmission in the subframe on the second CC; means for determining that a transmission of an SRS in an uplink portion of the first CC would at least partially collide with one of the uplink transmission or the downlink transmission; means for determining to adjust at least one of the uplink transmission, the SRS transmission, or reception of the downlink transmission based on the determination of the collision and an interruption time to transmit the SRS in the uplink portion of the first CC; means for performing at least one of transmitting the uplink transmission on the second CC, receiving the downlink transmission on the second CC, or transmitting the SRS on the first CC based on the determination to adjust; means for dropping the transmission of the SRS; means for shortening the uplink transmission; means for refraining from receiving the downlink transmission; means for puncturing the uplink transmission; means for refraining from switching; means for transmitting, means for receiving; means for transmitting a capability of the UE to an eNB; means for receiving instructions regarding transmission of the SRS; means for applying instructions received from an eNB; and means for determining whether to switch from the uplink transmission on a second CC or a second uplink transmission on a third CC; and means for sounding a plurality of SRSs.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
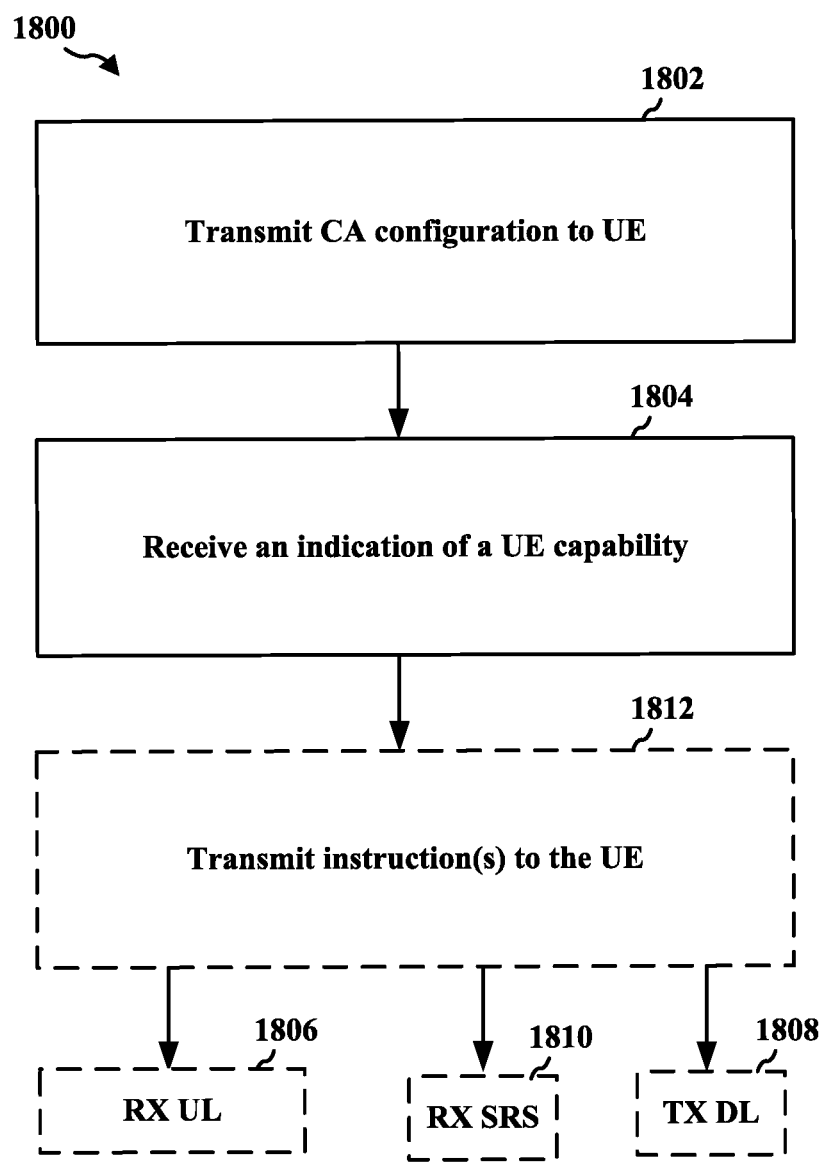
FIG. 18 is a flowchart of a method of wireless communication.

FIG. 18 is a flowchart 1800 of a method of wireless communication. The method may be performed by a base station such as an eNB, gNB, etc. (e.g., the eNB 102, 310, the apparatus 1902/1902'). At 1802, the eNB transmits a carrier aggregation configuration comprising a first, downlink, CC and a second CC to a UE, the first CC being a TDD CC, the configuration including downlink portions and excluding uplink portions of the first CC for data transmission by the UE. At 1804, the eNB receives an indication of a capability from the UE. The indication of the capability may comprise an indication of a number of uplink carriers on which the UE can transmit concurrently. The indication of the capability may comprise an indication of a switching time of the UE when transitioning between an uplink transmission on the first CC and an uplink transmission on the second CC.

Then, the eNB performs at least one of receiving an uplink transmission from the UE on a second CC at 1806, transmits a downlink transmission to the UE on the second CC at 1808, or receives the SRS in the uplink portion of the first CC at 1810.

There may be a switching time between receiving the uplink transmission from the UE on the second CC to receiving the SRS transmission from the UE in the uplink portion of the first CC or between transmitting the downlink transmission to the UE on the second CC and receiving of the SRS in the uplink portion of the first CC. The eNB may take the switching time into account when receiving uplink communication or SRS transmissions from the UE or when transmitting downlink communication to the UE. Thus, the performing by the eNB may be based on the switching time. The switching time may correspond to an interruption time.

At 1812, the eNB may transmit an instruction to the UE. The instruction may comprise at least one of an SRS configuration, an indication to restrict the subframes on which the UE should transmit a PUCCH to a subset of uplink subframes of the second CC, an indication to the UE regarding use of at least one prioritization rule to determine whether to transmit the SRS on the first CC, to transmit the uplink transmission on the second CC, or to receive the downlink transmission on the second CC, an indication to the UE regarding puncturing the uplink transmission on the second CC with the transmission of the SRS; or an indication regarding selecting one of a plurality of CCs to interrupt in order to transmit the SRS.

At 1812, the eNB may instruct a UE to sound a plurality of CCs or a plurality of subbands of the first CC by transmitting a plurality of SRSs in uplink portions of at least one TDD CC on which the UE is configured for downlink portions and excluded for uplink portions, wherein the plurality of SRSs are transmitted in one of a plurality of CCs; a plurality of subbands in a same CC; and a same subband of the same CC using SRS repetition. The instruction at 1820 may be for a plurality of UEs to each sound a plurality of CCs by staggering transmissions by the plurality of UEs. The eNB may align a first SRS transmission of a first UE with a retuning period of a second UE. The instruction may instruct the UE to repeat the SRS and/or to apply a code cover to the SRS.

Figure 19:
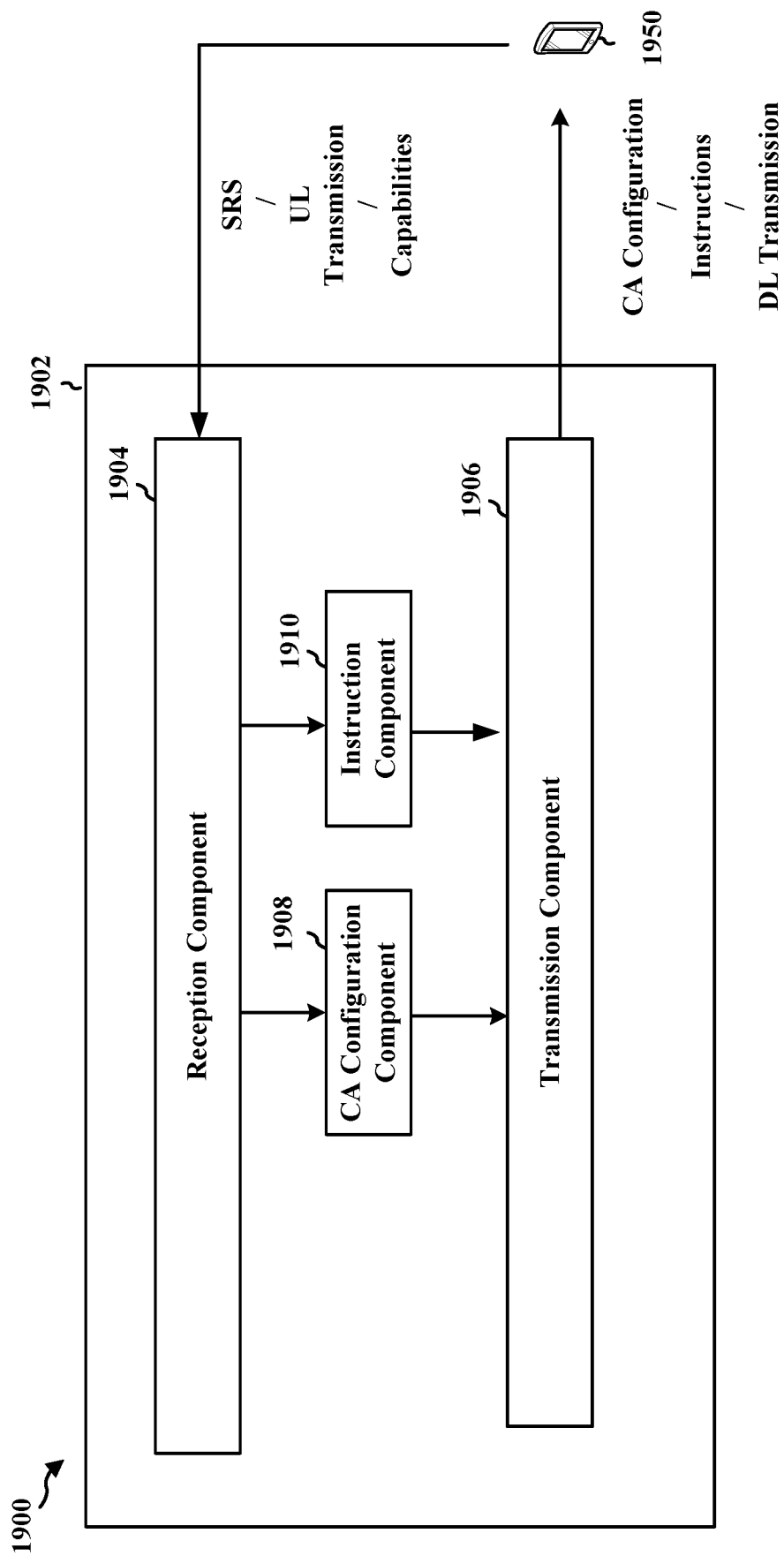
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be an eNB. The apparatus includes a reception component 1904 that receives uplink communication eNB, including SRS, UE capabilities, and other uplink transmission and a transmission component 1906 that transmission downlink communication to at least one UE 1950. The transmission component 1906 may transmit a carrier aggregation configuration, as provided by CA component 1908, for a first CC to a UE, the first CC being a TDD CC, the configuration including downlink portions and excluding uplink portions of the first CC for use by the UE.

The reception component 1906 may receive an indication of a capability from the UE. The CA component 1908 may cause the eNB to perform at least one of receiving an uplink transmission from the UE on a second CC, transmitting a downlink transmission to the UE on the second CC, or receiving the SRS in the uplink portion of the first CC, e.g., based on the CA configuration and/or the information provided by the UE. The apparatus may also include an instruction component 1910 that transmits an instruction to the UE, e.g., as described in connection with 1812 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
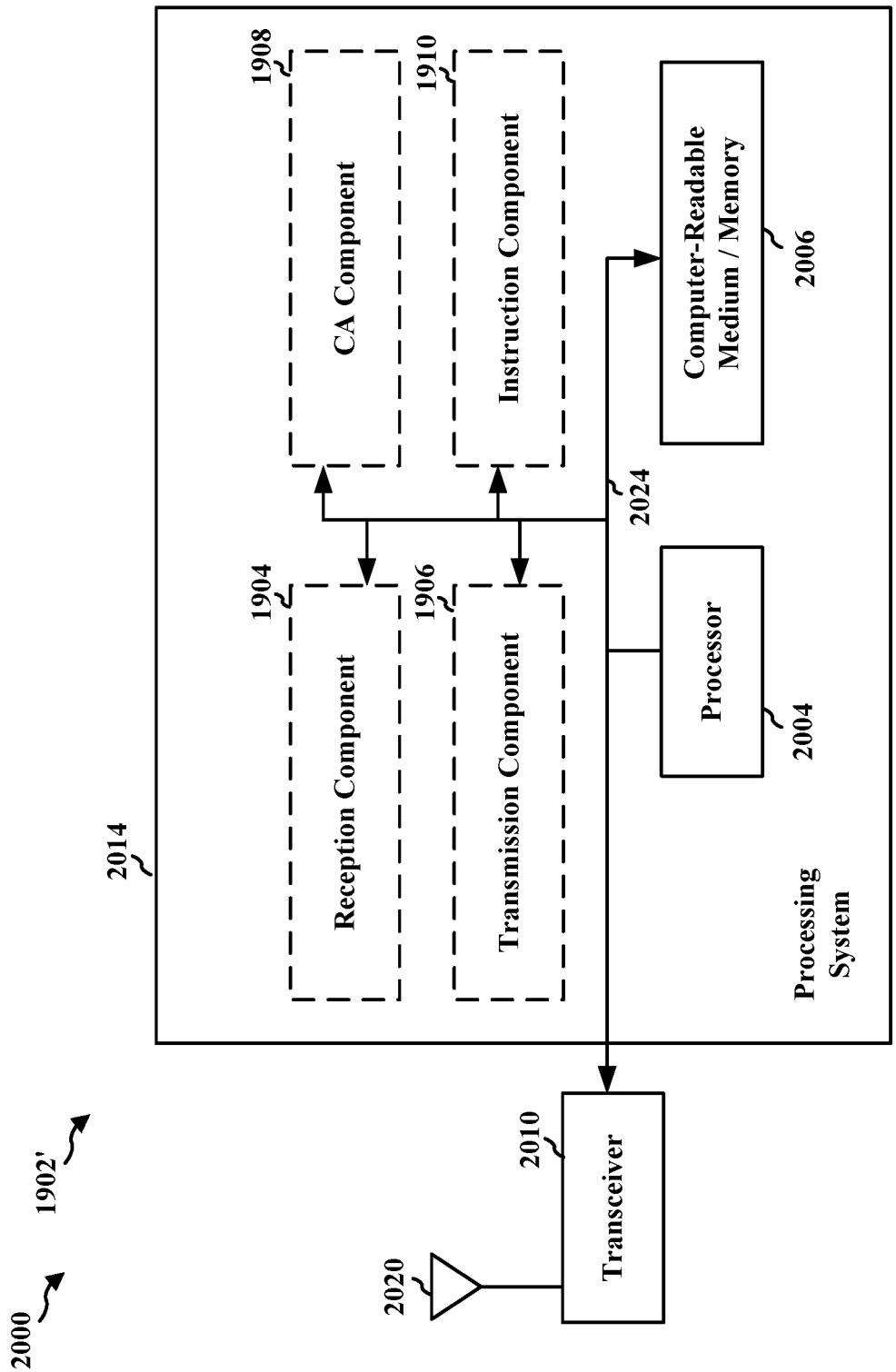
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910. The components may be software components running in the processor 2004, resident/stored in the computer readable medium/memory 2006, one or more hardware components coupled to the processor 2004, or some combination thereof. The processing system 2014 may be a component of the eNB 310 and may include the memory 376 and/or at least one of the TX processor 316, the RX processor 370, and the controller/processor 375.

In one configuration, the apparatus 1902/1902' for wireless communication includes means for transmitting a configuration; means for receiving; means for performing, means for transmitting an instruction to the UE, and means for instructing a UE(s). The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a carrier aggregation configuration for a first component carrier (CC) as a secondary cell, the first CC being a time division duplex (TDD) CC, the carrier aggregation configuration including downlink portions and excluding uplink portions of the first CC for data transmission by the UE;
   determining that a sounding reference signal (SRS) transmission in an uplink portion of the first CC would at least partially overlap in time with an uplink transmission on a second CC;
   adjusting the uplink transmission or the SRS transmission based on the determination and an interruption time of the UE to transmit the SRS in the uplink portion of the first CC,
      wherein the interruption time is based at least in part on a capability of the UE for switching between transmissions on different CCs, and
      wherein adjusting the uplink transmission or the SRS transmission includes applying at least one prioritization rule to determine whether to drop the SRS transmission or the uplink transmission; and
   performing at least one of transmitting the uplink transmission on the second CC or transmitting the SRS in the uplink portion of the first CC.

2. The method of claim 1, wherein the at least one prioritization rule is based on a type of the SRS transmission.

3. The method of claim 2, wherein the at least one prioritization rule is based on the SRS being an aperiodic SRS or a periodic SRS.

4. The method of claim 1, wherein the at least one prioritization rule is based on a type of information comprised in the uplink transmission on the second CC.

5. The method of claim 4, wherein the at least one prioritization rule is based on the type of information being at least one of a hybrid automatic repeat request acknowledgment (HARQ-ACK), a scheduling request (SR), or channel state information (CSI).

6. The method of claim 5, wherein the at least one prioritization rule is further based on a type of the CSI comprised in the uplink transmission.

7. The method of claim 1, wherein the adjusting comprises dropping the SRS transmission on the first CC when the type of information comprised in the uplink transmission on the second CC is a hybrid automatic repeat request acknowledgment (HARQ-ACK), a scheduling request (SR), or a channel state information (CSI).

8. The method of claim 1, wherein the at least one prioritization rule is based on a channel type of the uplink transmission on the second CC.

9. The method of claim 8, wherein the at least one prioritization rule is based on the uplink transmission comprising a physical random access channel (PRACH) transmission, a physical uplink shared channel (PUSCH) transmission or a physical uplink control channel (PUCCH) transmission.

10. The method of claim 9, wherein the at least one prioritization rule indicates for the UE to drop the SRS transmission when the uplink transmission comprises the PUSCH transmission or the PUCCH transmission carrying at least one of the PRACH transmission, a hybrid automatic repeat request acknowledgment (HARQ-ACK), or a scheduling request (SR).

11. The method of claim 1, wherein the at least one prioritization rule indicates for the UE to drop the SRS transmission based on the uplink transmission comprising channel state information (CSI).

12. The method of claim 1, wherein the UE transmits the SRS in the uplink portion of the first CC based on the at least one prioritization rule.

13. The method of claim 1, wherein the capability of the UE for switching between transmissions on different CCs comprises a retuning time of the UE.

14. The method of claim 13, wherein the retuning time of the UE is associated with frequency bands of the different CCs.

15. The method of claim 1, wherein the SRS transmission overlaps with the uplink transmission of the second CC in at least one symbol.

16. The method of claim 1, wherein the adjusting further comprises determining whether simultaneous transmissions on a number of CCs of the carrier aggregation configuration would exceed an uplink transmit capability of the UE.

17. An apparatus for wireless communication at a user equipment (UE), comprising:
   a memory; and
   at least one processor coupled to the memory and configured to:
      receive a carrier aggregation configuration for a first component carrier (CC) as a secondary cell, the first CC being a time division duplex (TDD) CC, the carrier aggregation configuration including downlink portions and excluding uplink portions of the first CC for data transmission by the UE;

determine that a sounding reference signal (SRS) transmission in an uplink portion of the first CC would at least partially overlap in time with an uplink transmission on a second CC;

adjust the uplink transmission or the SRS transmission based on the determination and an interruption time of the UE to transmit the SRS in the uplink portion of the first CC, wherein the interruption time is based at least in part on a capability of the UE for switching between transmissions on different CCs, and wherein adjusting the uplink transmission or the SRS transmission includes applying at least one prioritization rule to determine whether to drop the SRS transmission or the uplink transmission; and perform at least one of transmitting the uplink transmission on the second CC or transmitting the SRS in the uplink portion of the first CC.

18. The apparatus of claim 17, wherein the at least one prioritization rule is based on a type of the SRS transmission.

19. The apparatus of claim 18, wherein the at least one prioritization rule is based on the SRS being an aperiodic SRS or a periodic SRS.

20. The apparatus of claim 17, wherein the at least one prioritization rule is based on a type of information comprised in the uplink transmission on the second CC.

21. The apparatus of claim 20, wherein the at least one prioritization rule is based on the type of information being at least one of a hybrid automatic repeat request acknowledgment (HARQ-ACK), a scheduling request (SR), or channel state information (CSI).

22. The apparatus of claim 21, wherein the at least one prioritization rule is further based on a type of the CSI comprised in the uplink transmission.

23. The apparatus of claim 17, wherein the at least one prioritization rule is based on a channel type of the uplink transmission on the second CC.

24. The apparatus of claim 23, wherein the at least one prioritization rule is based on the uplink transmission comprising a physical random access channel (PRACH) transmission, a physical uplink shared channel (PUSCH) transmission or a physical uplink control channel (PUCCH) transmission.

25. The apparatus of claim 17, wherein the at least one prioritization rule indicates for the apparatus to drop the SRS transmission when the uplink transmission comprises at least one of a physical random access channel (PRACH) transmission, a hybrid automatic repeat request acknowledgment (HARQ-ACK), a scheduling request (SR).

26. The apparatus of claim 17, wherein the at least one prioritization rule indicates for the apparatus to drop the SRS transmission based on the uplink transmission comprising channel state information (CSI).

27. The apparatus of claim 17, wherein the apparatus is configured to transmit the SRS in the uplink portion of the first CC based on the at least one prioritization rule.

28. The apparatus of claim 17, wherein the capability of the UE for switching between transmissions on different CCs comprises a retuning time of the UE.

29. The apparatus of claim 28, wherein the retuning time of the UE is associated with frequency bands of the different CCs.

30. The apparatus of claim 17, wherein the apparatus is configured to adjust the uplink transmission or the SRS transmission based further on a determination of whether simultaneous transmissions on a number of CCs of the carrier aggregation configuration would exceed an uplink transmit capability of the UE.

31. An apparatus for wireless communication at a user equipment (UE), comprising:

means for receiving a carrier aggregation configuration for a first component carrier (CC) as a secondary cell, the first CC being a time division duplex (TDD) CC, the carrier aggregation configuration including downlink portions and excluding uplink portions of the first CC for data transmission by the UE;

means for determining that a sounding reference signal (SRS) transmission in an uplink portion of the first CC would at least partially overlap in time with an uplink transmission on a second CC;

means for adjusting the uplink transmission or the SRS transmission based on the determination and an interruption time of the UE to transmit the SRS in the uplink portion of the first CC, wherein the interruption time is based at least in part on a capability of the UE for switching between transmissions on different CCs, and wherein the means for adjusting the uplink transmission or the SRS transmission are configured to apply at least one prioritization rule to determine whether to drop the SRS transmission or the uplink transmission; and means for performing at least one of transmitting the uplink transmission on the second CC or transmitting the SRS in the uplink portion of the first CC.

32. A non-transitory computer-readable medium storing computer executable code, the code when executed by a processor cause the processor to:

receive a carrier aggregation configuration for a first component carrier (CC) as a secondary cell, the first CC being a time division duplex (TDD) CC, the carrier aggregation configuration including downlink portions and excluding uplink portions of the first CC for data transmission by the UE;

determine that a sounding reference signal (SRS) transmission in an uplink portion of the first CC would at least partially overlap in time with an uplink transmission on a second CC;

adjust the uplink transmission or the SRS transmission based on the determination and an interruption time of the UE to transmit the SRS in the uplink portion of the first CC, wherein the interruption time is based at least in part on a capability of the UE for switching between transmissions on different CCs, and wherein adjusting the uplink transmission or the SRS transmission includes applying at least one prioritization rule to determine whether to drop the SRS transmission or the uplink transmission; and perform at least one of transmitting the uplink transmission on the second CC or transmitting the SRS in the uplink portion of the first CC.

* * * * *